United States Patent
Koslow

(10) Patent No.: US 8,597,552 B2
(45) Date of Patent: Dec. 3, 2013

(54) APPARATUS, SYSTEMS AND METHODS FOR PRODUCING PARTICLES USING ROTATING CAPILLARIES

(76) Inventor: Evan Koslow, Kitchener (CA)

( * ) Notice: Subject to any disclaimer, the term of this patent is extended or adjusted under 35 U.S.C. 154(b) by 56 days.

(21) Appl. No.: 13/256,330

(22) PCT Filed: Mar. 16, 2010

(86) PCT No.: PCT/CA2010/000391
§ 371 (c)(1),
(2), (4) Date: Nov. 22, 2011

(87) PCT Pub. No.: WO2010/105352
PCT Pub. Date: Sep. 23, 2010

(65) Prior Publication Data
US 2012/0056342 A1    Mar. 8, 2012

Related U.S. Application Data

(63) Continuation-in-part of application No. PCT/CA2009/000324, filed on Mar. 16, 2009.

(60) Provisional application No. 61/235,662, filed on Aug. 20, 2009, provisional application No. 61/235,670, filed on Aug. 20, 2009.

(30) Foreign Application Priority Data

Mar. 16, 2009   (WO) ................ PCT/CA2009/000324

(51) Int. Cl.
*B29B 9/00* (2006.01)
(52) U.S. Cl.
USPC .................. 264/8; 239/7; 65/469; 75/334
(58) Field of Classification Search
None
See application file for complete search history.

(56) References Cited

U.S. PATENT DOCUMENTS

| 2,587,710 A | 3/1952 | Downey |
| 2,931,422 A | 4/1960 | Long |

(Continued)

FOREIGN PATENT DOCUMENTS

| AU | 2002300929 | 12/2003 |
| EP | 1502654 | 2/2005 |

(Continued)

OTHER PUBLICATIONS

International Bureau, Written Opinion and International Search Report, PCT Patent Application Serial No. PCT/CA2010/000391 mailed Jun. 7, 2010.

(Continued)

*Primary Examiner* — Mary F Theisen
(74) *Attorney, Agent, or Firm* — Bereskin & Parr LLP

(57) ABSTRACT

An apparatus for forming particles from a liquid, including a rotor assembly having at least one surface sized and shaped so as to define at least one capillary. Each capillary has an inner region adjacent an axis of rotation of the rotor assembly, an outer region distal from the axis of rotation, and an edge adjacent the outer region. The rotor assembly is configured to be rotated at an angular velocity selected such that when the liquid is received in the inner region of the at least one capillary, the liquid will move from the inner region to the outer region, adopt an unsaturated condition on the at least one surface such that the liquid flows as a film along the at least one surface and does not continuously span the capillary, and, upon reaching the edge, separates from the at least one surface to form at least one particle.

93 Claims, 17 Drawing Sheets

(56) References Cited

U.S. PATENT DOCUMENTS

| | | | |
|---|---|---|---|
| 2,996,287 A * | 8/1961 | Audran | 366/265 |
| 3,097,085 A | 7/1963 | Wallsten | |
| 3,357,807 A | 12/1967 | Stalego | |
| 3,474,597 A | 10/1969 | Eckert | |
| 3,650,716 A | 3/1972 | Brossard | |
| 3,807,712 A | 4/1974 | Whitaker | |
| 3,928,009 A | 12/1975 | Perry | |
| 4,058,386 A | 11/1977 | Faulkner et al. | |
| 4,277,436 A | 7/1981 | Shah et al. | |
| 4,604,109 A * | 8/1986 | Koslow | 95/248 |
| 4,643,852 A * | 2/1987 | Koslow | 261/93 |
| 4,745,853 A | 5/1988 | Hoover | |
| 4,804,112 A | 2/1989 | Jeans | |
| 4,832,723 A | 5/1989 | Shisler et al. | |
| 4,850,269 A | 7/1989 | Hancock et al. | |
| 1,610,062 A | 8/1989 | Koenig | |
| 4,937,020 A | 6/1990 | Wagner et al. | |
| 5,019,302 A * | 5/1991 | Sparks et al. | 264/8 |
| 5,071,595 A | 12/1991 | Burrows | |
| 5,073,312 A | 12/1991 | Burrows | |
| 5,085,810 A | 2/1992 | Burrows | |
| 5,114,631 A | 5/1992 | Nyssen et al. | |
| 5,326,241 A | 7/1994 | Rook et al. | |
| 5,419,461 A | 5/1995 | Goulet | |
| 5,422,045 A | 6/1995 | Notar et al. | |
| 5,622,671 A | 4/1997 | Pellegrin et al. | |
| 5,792,391 A | 8/1998 | Vogel et al. | |
| 5,842,600 A | 12/1998 | Singleterry et al. | |
| 5,855,296 A | 1/1999 | McCann et al. | |
| 6,142,458 A | 11/2000 | Howk | |
| 6,585,169 B2 * | 7/2003 | Andersson | 239/7 |
| 6,758,462 B2 | 7/2004 | Bellas et al. | |
| 6,783,708 B2 * | 8/2004 | Konishi | 264/8 |
| 6,935,624 B2 | 8/2005 | Bellas et al. | |
| 7,118,698 B2 | 10/2006 | Armantrout et al. | |
| 2003/0029928 A1 * | 2/2003 | Andersson et al. | 239/7 |
| 2006/0255487 A1 * | 11/2006 | Sibley et al. | 264/8 |
| 2012/0067427 A1 | 3/2012 | Koslow | |
| 2012/0087255 A1 | 4/2012 | Ukita et al. | |
| 2012/0098148 A1 | 4/2012 | Koslow et al. | |
| 2012/0103198 A1 | 5/2012 | Koslow et al. | |
| 2012/0132074 A1 | 5/2012 | Koslow et al. | |

FOREIGN PATENT DOCUMENTS

| | | |
|---|---|---|
| GB | 533344 | 2/1941 |
| GB | 1282097 | 7/1972 |
| JP | 8309172 | 11/1996 |
| WO | 2000/18512 | 4/2000 |

OTHER PUBLICATIONS

International Bureau, Written Opinion and International Search Report, PCT Patent Application Serial No. PCT/CA2009/000324 mailed Dec. 7, 2009.

International Bureau, Written Opinion and International Search Report, PCT Patent Application Serial No. PCT/CA2009/000323, mailed Oct. 21, 2009.

International Bureau, Written Opinion and International Search Report, PCT Patent Application Serial No. PCT/CA2010/000390, mailed Jul. 2, 2010.

\* cited by examiner

APPARATUS, SYSTEMS AND METHODS FOR PRODUCING PARTICLES USING ROTATING CAPILLARIES

RELATED APPLICATIONS

This application is a continuation-in-part of International Application No. PCT/CA2009/000324 filed on Mar. 16, 2009, and entitled "Apparatus, Systems and Methods for Producing Particles Using Rotating Capillaries", the entire contents of which are hereby incorporated herein by reference for all purposes; this application also claims the benefit of U.S. Provisional Patent Application No. 61/235,662 filed on Aug. 20, 2009 and entitled "Apparatus, Systems and Methods for Producing Particles Using Rotating Capillaries", the entire contents of which are hereby incorporated herein by reference for all purposes; this application also claims the benefit of U.S. Provisional Patent Application No. 61/235,670, filed on Aug. 20, 2009 and entitled "Apparatus, Systems and Methods for Producing Particles Using Rotating Capillaries", the entire contents of which are hereby incorporated herein by reference for all purposes.

TECHNICAL FIELD

The embodiments disclosed herein relate to the production of particles, and in particular to apparatus and methods for producing particles from liquids using rotating apparatus.

INTRODUCTION

Various rotating apparatus for forming particles (e.g. droplets or fibers) are known. For example, a nozzle or an array of orifices may be spun using a rotor so as to extrude a liquid through the orifices to form fibers or other particles. However, the sizes of such particles are generally proportionate to the size of the orifices through which they are extruded. Since there are practical limitations as to how small such orifices can be made, particles formed using these techniques tend to be fairly large.

Another known technique is to use a flat or curved spinning disc onto which a pool of liquid is added. The spinning disc causes the pool of liquid to spread outwardly towards the edge, and eventually the liquid separates from the disc as small particles. However, the pool of liquid tends to experience violent torque, non-wetting reactions, and interactions with the surrounding air (particularly when the disc is rotating at a high angular velocity), which cause the liquid to react in unpredictable ways and tends to greatly limit the fluid feed rate of such devices.

One proposed solution to these problems uses a stationary shear plate above the rotating disc in the region directly adjacent to the centre of the device where the liquid is released. However, this solution does not fully resolve the liquid instabilities and cannot solve the problems of air shear once the liquid emerges beyond the stationary shear plate. Furthermore, the stationary shear plate causes severe drag within the liquid, which is generally undesirable (particularly when operating at extremely high speeds).

In the case of spinning rotors with numerous small orifices, it can be seen that control of the fluid motion while it enters these orifices is generally not capable of seriously limiting the ability of the fluid to make a stable transition through the small orifices themselves. However, the size and number of these machined orifices is a major limit on fiber size and fluid throughput. Accordingly, very high attenuation of the fluid stream emerging from these orifices is required to obtain small particles or fibers.

Alternatively, the formation of "synthetic orifices" through the breakup of a fluid at the edge of a spinning disc is attractive for the production of small particles (droplets, ligaments or fibers). However, the stability of a fluid moving toward the edge of such a spinning disc and exposed to open air is very unstable, with the original fluid pool tending to spin wildly and a wide range of fluid instabilities being created as the fluid moves to the edge of the spinning disc. The result is an extreme limitation upon practical fluid feed rate, usually only a few milliliters per minute on discs of practical size.

Accordingly, there is a need in the art for improved apparatus and methods for the production of particles using rotating apparatus.

SUMMARY

The embodiments described herein generally relate to earlier work performed by the inventor involving rotating discs. For example, U.S. Pat. No. 4,604,109 (filed by the inventor on Nov. 20, 1984) describes a device for separating a substantial fraction of a volatile contaminant from a contaminated fluid. The device comprises a vacuum chamber having an internal space that may be at least partially evacuated, at least one rotating plate disposed within the vacuum chamber with the edge of the rotating plate being spaced from a coalescing means, means for introducing the contaminated fluid onto the surface of the plate whereby small droplets of the contaminated fluid are centrifugally dispersed from the edge of the rotating plate. The distance between the edge of the rotating plate and the coalescing means yields a sufficient droplet residence time to permit the fraction of the volatile contaminant to be separated from the contaminated fluid as the droplets travel between the edge of the rotating plate and the coalescing means.

Furthermore, U.S. Pat. No. 4,643,852 (filed by the inventor on Dec. 30, 1985) describes an apparatus for generating gas bubbles in a liquid. The apparatus includes at least one rotatable member, in the shape of a disc or ring, which is wettable by the liquid and rotatable therein at an edge velocity of at least 70 feet per second. The upper surface of the rotatable member is parallel to, and spaced from, a stationary plate to form a shear zone. Gas, or some other fluid, is supplied proximate the upper surface of the rotatable circular member to form the bubbles. Optimized relationships between the radius of the disc or ring and its speed of rotation are disclosed to enhance the efficiency of operation of the apparatus.

The inventor has now determined that it is desirable to provide an apparatus that controls and contains the original pool of fluid released onto or into a spinning apparatus, a system that protects and contains the fluid while it transitions to stable film flow and that greatly increases the available surface for film flow and the formation of tiny pools of fluid at the edge of a spinning rotor. If the surface area and edge circumference are increased, potential particle generating capacity is correspondingly increased. If the edge of the spinning rotor is transformed to a one-dimensional line, then the site of the resulting "synthetic orifices" collapses to correspond with the radius of the edge, potentially very tiny. The number of "synthetic orifices" or individual emission points at the spinning edge is defined by the physics of the fluid and the rotor plates and can reach numbers beyond the number that is practical using traditional machining of actual orifices.

According to one embodiment of the invention there is provided an apparatus for forming particles from a liquid, comprising a rotor assembly having at least one surface sized and shaped so as to define at least one capillary, each capillary having an inner region adjacent an axis of rotation of the rotor assembly, an outer region distal from the axis of rotation, and an edge adjacent the outer region, wherein the rotor assembly is configured to be rotated at an angular velocity selected such that when the liquid is received in the inner region of the at least one capillary, the liquid will move from the inner region to the outer region, adopt an unsaturated condition on the at least one surface such that the liquid flows as a film along the at least one surface and does not continuously span the capillary, and, upon reaching the edge, separates from the at least one surface to form at least one particle.

The rotor assembly may include two plates having opposing upper and lower planar surfaces spaced apart by a gap distance and defining at least one capillary therebetween. In some examples, the gap distance may be between about 5 and 2000 micrometers.

In some embodiments, the edge is a blunt edge. In other embodiments, the edge is a sharp edge having a radius selected to inhibit the accumulation of liquid thereon. In some examples, the sharp edge may have a radius of less than 30 micrometers.

The rotor assembly may include at least three plates (including an upper plate, a lower plate, and at least one intermediate plate) having at least two pairs of opposing planar surfaces, each pair of opposing planar surfaces spaced apart by a gap distance and defining a capillary therebetween. The edges of at least one of the plates (e.g. the intermediate plate(s)) may be bifurcated so as to provide two effective sets of emission surfaces on each plate and thereby double the throughput of the liquid and conversion into particles.

The apparatus may further comprise a shroud adjacent the rotor assembly and being configured to direct air flowing around the rotor assembly as the rotor assembly rotates to facilitate the separation of the liquid from the at least one surface and the attenuation or stretching of the particles into smaller or thinner structures and/or to accomplish controlled chemical reactions with the surrounding gas and/or controlled physical conditions such as temperature or shear applied by the surrounding gas to the particles forming at the edge of the capillary.

In some examples, the rotor assembly may be configured such that the diameter of the rotor times the rate of rotation may greater than 50,000 cm·RPM. In other examples, the rotor assembly may be configured such that this figure might be as high as 700,000 cm·RPM. In yet other examples, this figure might be higher than 700,000 cm·RPM.

In yet other examples, the angular velocity and plate diameter may be selected such that the diameter of the plate times the rate of rotation is between about 10,000 cm·RPM and 1.4 million cm·RPM.

The apparatus may further comprise a feed chamber for receiving the liquid, the feed chamber being adjacent the axis of rotation and in fluid communication with the inner region of each capillary.

According to another aspect of the invention, there is provided a method for forming particles, comprising the steps of providing at least one surface sized and shaped so as to define at least one capillary, each capillary having an inner region, an outer region, and an edge, providing a liquid to the inner region of the at least one capillary, and rotating the capillary at an angular velocity selected such that the liquid will move from the inner region to the outer region, adopt an unsaturated condition on the at least one surface such that the liquid flows as a film along the at least one surface and does not continuously span the capillary, and, upon reaching the edge, separate from the at least one surface to form at least one particle.

The liquid may be provided to the inner region at an actual mass flow rate less than a potential mass flow rate of liquid that can be pumped by centripetal forces into the capillary.

The method may further include the step of attenuating the particles after they have separated from the at least one surface. For droplets, such attenuation may involve evaporation to a smaller droplet or to leave a dry particle. For ligaments and fibers, this may involve evaporation of a solvent, and/or elongation in the surrounding gas.

The step of providing at least one surface sized and shaped so as to define at least one capillary may include providing a rotor assembly including two plates having opposing upper and lower surfaces spaced apart by a gap distance to define at least one capillary therebetween.

The method may further comprise the step of directing air flowing around the at least one capillary to facilitate the separation of the liquid from the at least one surface.

The liquid may be provided to the inner region at an input mass flow rate, and the input mass flow rate and angular velocity may be selected so that the liquid separates from the at least one edge as a generally continuous film.

This continuous film released from the outer edge of the capillary can be subjected to forces, once emerging from this edge, that further transforms this film into small particles consisting of droplets or fibers depending upon the characteristics of the fluid and its surface testing and rheology.

In some examples, the angular velocity may be selected such that, as the at least one surface rotates, the at least one surface interacts with surrounding air so as to heat the liquid.

In some embodiments, the liquid is selected from the group consisting of liquid polymers, molten glasses, molten metals, molten salts, minerals, ceramics, and liquid substances such as suspensions, solutions, and emulsions in a wide variety of liquid carriers such as solvents (hexane, water, chloroform, etc.) or mixtures of liquids that can be homogenized during their passage through the capillary and their transition into particles.

That is, the liquid can also be composed of two immiscible fluids that can be homogenized during their passage through the capillary and release from the edge. This homogenization is the result of the shear forces acting on the rotor plates and the extreme forces generating during particle formation.

The liquid may be a melted polymer, and the method may further comprise the step of melting the polymer to form the liquid, and wherein the melted polymer solidifies by cooling as it separates from the at least one surface to form solid particles.

In some examples, the particles may be fibers or droplets.

In some embodiments, the method may further comprise the step of mixing the droplets produced herein with at least one gas. The liquid may include water and the gas may include carbon dioxide, and the mixing of the droplets as they pass through the surrounding carbon dioxide atmosphere may produce carbonated water.

The liquid may include a fuel and the gas may include oxygen, and the method may further comprise the step of igniting the mixture in a combustion chamber. Hence, the spinning capillary system may be used as a fuel atomizer to promote efficient combustion.

In some embodiments, the at least one gas includes pollutants entrained therein, and the mixing of droplets in said gas is configured to remove the pollutants from the at least one gas. Hence, droplets formed by the spinning capillary can absorb pollutants in a surrounding gas by wet scrubbing, and in some examples such absorption can be enhanced by the presence of chemicals within the droplets having an affinity for the pollutant chemicals.

In some embodiments, the emitted droplets may be subjected to a vacuum selected so as to freeze dry the droplets, to produce a dry powder or particles, which may be useful, for example, in pharmaceutical and food production.

In some embodiments, the at least one gas may be heated or its latent heat may be sufficient so that the spray of fine droplets dries and leaves a residual dry powder as in spray drying applications.

The method may further comprise the step of subjecting the emitted particles to at least one of a vacuum, heat, cooling, light and ionizing radiation. In some examples, a vacuum may be used to remove volatile contaminants with an otherwise low volatility as, for example, in the case of removing water and volatile contaminants from lubricating and hydraulic fluids.

In some embodiments, the liquid is a melted polymer, and the method further comprises the step of mixing the emitted particles of polymer with a gas having activated carbon particles entrained therein so as to form a carbon-polymer composite when the particles and activated carbon are collected into a fabric-forming screen (e.g. using an applied vacuum).

In some embodiments, the emerging liquid can be attenuated through the application of a high voltage (e.g. electrospinning).

According to another aspect of the invention, there is provided an apparatus for forming particles from a liquid, comprising a rotor assembly having at least two plates secured to a spindle and having at least one pair of opposing surfaces thereon, each pair of opposing surfaces spaced apart by a gap distance and defining at least one capillary therebetween, each capillary having an inner region adjacent an axis of rotation of the rotor assembly, an outer region distal from the axis of rotation, and an edge adjacent the outer region, wherein the spindle is configured to be coupled to a drive mechanism configured to rotate the rotor assembly at an angular velocity selected such that when the liquid is received in the inner region of the at least one capillary, the liquid will move from the inner region to the outer region, adopt an unsaturated condition on the at least one surface such that the liquid flows as a film along the at least one surface and does not continuously span the capillary, and, upon reaching the edge, separates from the at least one surface to form at least one particle.

The width of the capillary should be sufficiently small so that the fluid feed and spreading instabilities are eliminated and air shear is also eliminated. This overcomes prior limitations on fluid feed rate and results in a controlled behavior of the fluid.

In addition, greatly increased liquid feed rate is made possible by the compact provision of the closely spaced surfaces, and in some cases the bifurcation of the edges of the capillary may further double the liquid emission surfaces. Hence, the capillary geometry overcomes various prior limits on this technology and greatly enhances productivity.

According to yet another aspect of the invention, there is provided a method for emulsifying at least two immiscible liquids, comprising the steps of providing at least one surface sized and shaped so as to define at least one capillary, each capillary having an inner region, and an outer region, providing the at least two immiscible liquids to the inner region of the at least one capillary; and rotating the capillary at an angular velocity selected so as to generate shear forces within the capillary sufficient so that, as the at least two liquids move from the inner region to the outer region, the at least two immiscible liquids mix together.

BRIEF DESCRIPTION OF THE DRAWINGS

The drawings included herewith are for illustrating various examples of methods and apparatus of the present specification and are not intended to limit the scope of what is taught in any way. In the drawings.

DETAILED DESCRIPTION

Figure 1:
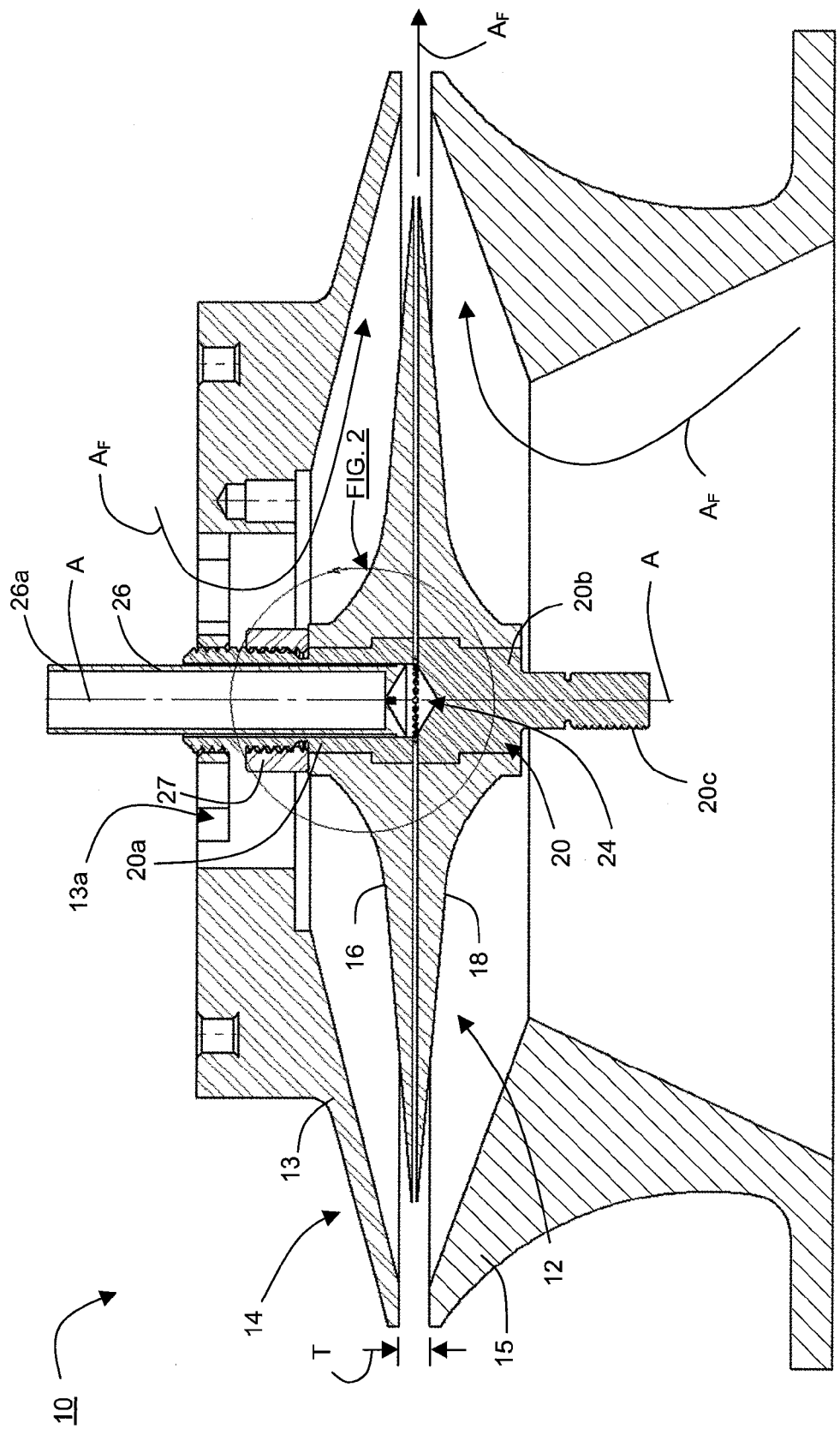
FIG. 1 is a cross-sectional elevation view of an apparatus for producing particles according to one embodiment of the invention.

Turning to FIG. 1, illustrated therein is an apparatus 10 for forming particles according to one embodiment of the invention.

The term "particles" as generally used herein includes fibers (e.g. filaments, ligaments, etc.), droplets, and other similar shapes made from any suitable liquid (e.g. liquid polymers, molten glasses, molten metals, pure liquids, solutions and suspensions, etc.) and which may solidify, evaporate, and/or remain in liquid form.

Generally, the apparatus 10 is configured so as to receive the material in a liquid state and then pass the liquid material through one or more rotating capillaries.

The term "capillary" as used herein generally refers to a space between two adjacent surfaces, or a space defined within a single surface that is closed in upon itself to present two surfaces that are connected by a curved region (e.g. a capillary tube). For example, the liquid material may be passed through a narrow space between two opposing surfaces on rotating plates or discs, or within the space bounded by one or more rotating tubes.

The capillaries are generally sized and shaped so as to eliminate or substantially reduce air friction and fluid flow instabilities encountered by the liquid material within the capillaries during rotation. Furthermore, the capillaries are sized and shaped such that, as they rotate, the liquid material within them adopts an unsaturated condition (e.g. where the liquid does not continuously span the width of the capillary but rather is discontinuous) as opposed to a saturated condition in which the liquid substantially fills the capillary (also known as pore flow, as compared with unsaturated film flow).

When the unsaturated liquid material reaches an outer edge of each rotating capillary, the liquid separates or disengages from the surfaces of the capillaries and may form particles (and/or may leave residual particles minus a carrier fluid). For example, where the liquid is a melted polymer, the melted polymer may cool as it separates from the surfaces and encounters ambient air so as to form polymer fibers or particles. Hence, the fluid emerging from the spinning capillary can undergo chemical or physical changes once emerging into the surrounding environment. In addition, some fluids may be altered when passing through the capillary itself, as a result of shear and film formation, which, for example, can cause immiscible fluids to become emulsified.

Once formed, the particles may be suitable for use in a virtually unlimited number of applications, including for example filtration, flame retardation, biomedical applications, radiological applications, insulating applications, textile applications (both woven and non-woven), chemical mixing, and so on.

Figure 2:
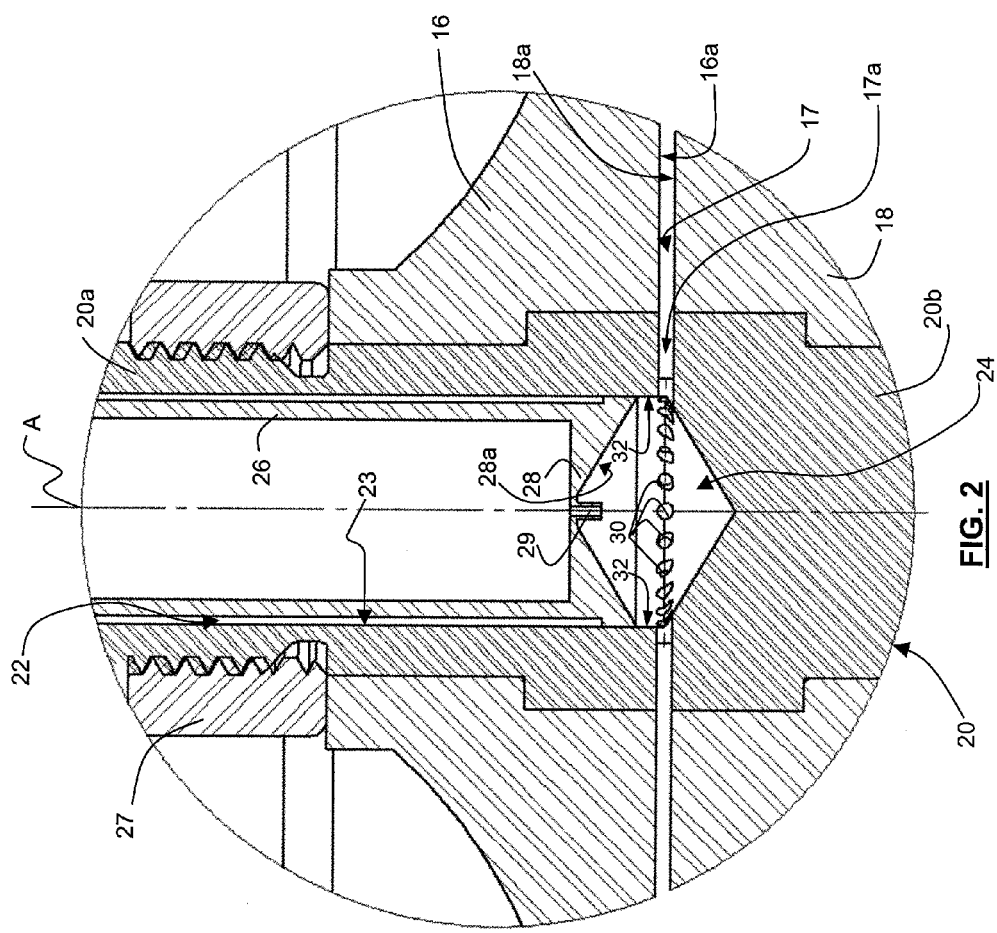
FIG. 2 is a close-up partial view of the apparatus of FIG. 1 showing a feed chamber in detail.

The apparatus 10 generally includes a rotor assembly 12 having surfaces that define at least one capillary therein. For example, as shown in FIGS. 1 and 2, a pair of upper and lower rotor plates 16, 18 have opposing upper and lower surfaces 16a, 18a. The upper and lower surfaces 16a, 18a are spaced apart by a gap distance (indicated generally as "d") and generally define a capillary 17 therebetween.

The rotor assembly 12 may also include a spindle 20 for rotating the rotor plates 16, 18. As shown in FIGS. 1 and 2, the rotor plates 16, 18 may be rigidly coupled to upper and lower portions 20a, 20b of the spindle 20, respectively, such as by using reverse or counter threads, bolts or any other suitable coupling technique. One or more spindle nuts 27 may also be used to further secure the rotor plates 16, 18 to the spindle 20.

During use, a coupling end 20c of the spindle 20 may be coupled to a drive mechanism (not shown), such as an electric motor, an air-driven turbine or other suitable drive mechanism, so that the spindle 20 can be rotated about a main axis of rotation A, causing the rotor plates 16, 18 to rotate at an angular velocity selected so as to generally cause an unsaturated condition in the liquid between the plates 16, 18.

In some embodiments, the upper and lower plates 16, 18 may be separately driven, and may be rotated at the same or substantially similar angular velocities. In other embodiments, the upper and lower plates 16, 18 may be rotated at different angular velocities.

The rotor assembly 12 may also include a feed chamber 24 generally at or near the center of the rotor assembly 12 (e.g. adjacent the axis of rotation A). The feed chamber 24 may serve as a repository for the liquid used to feed the capillaries 17 in the rotor assembly 12. As shown in FIG. 2, the feed chamber 24 may be provided as a small hollow region roughly in the center of the spindle 20, and may be cylindrical, spherical or have any other suitable shape.

Figure 5:
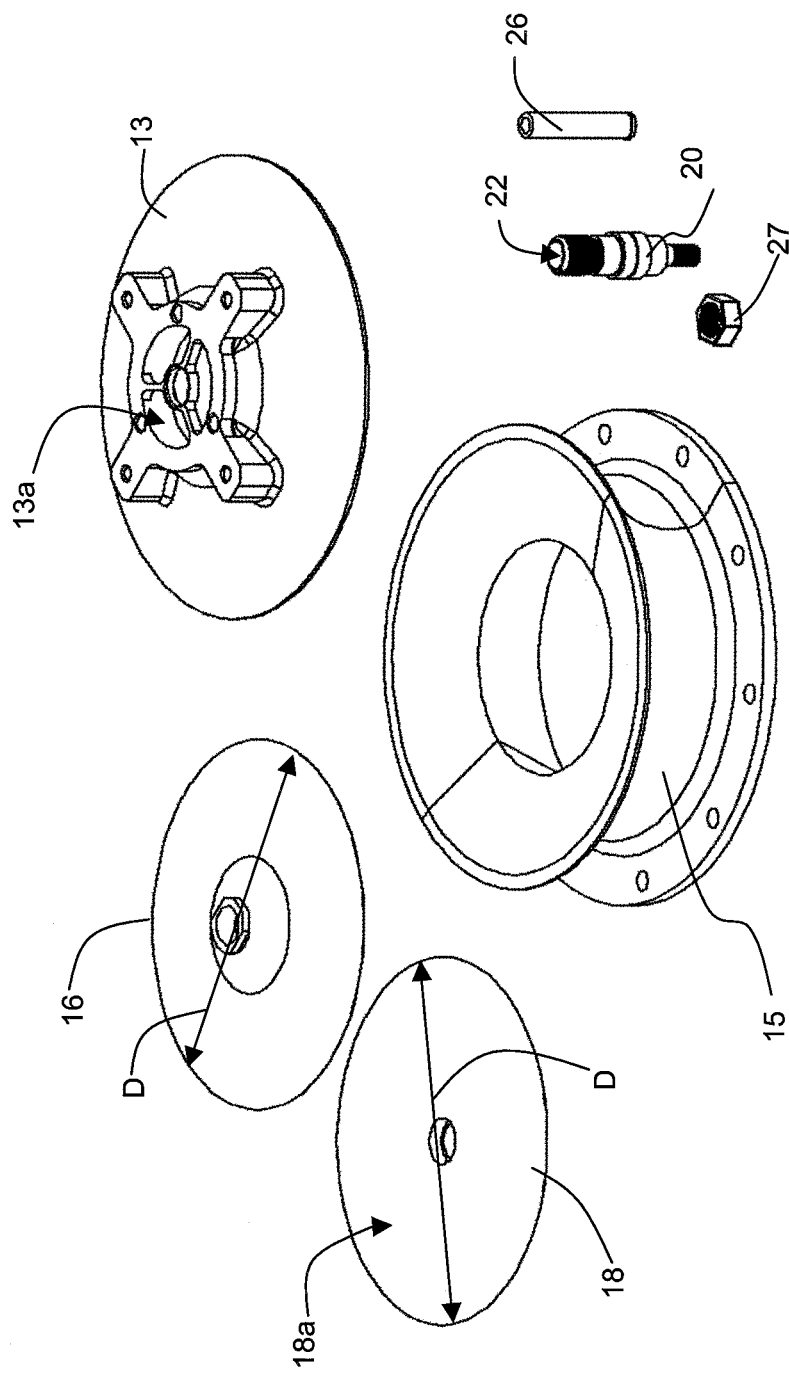
FIG. 5 is a perspective view of the apparatus of FIG. 1 shown in a disassembled state.
Figure 6:
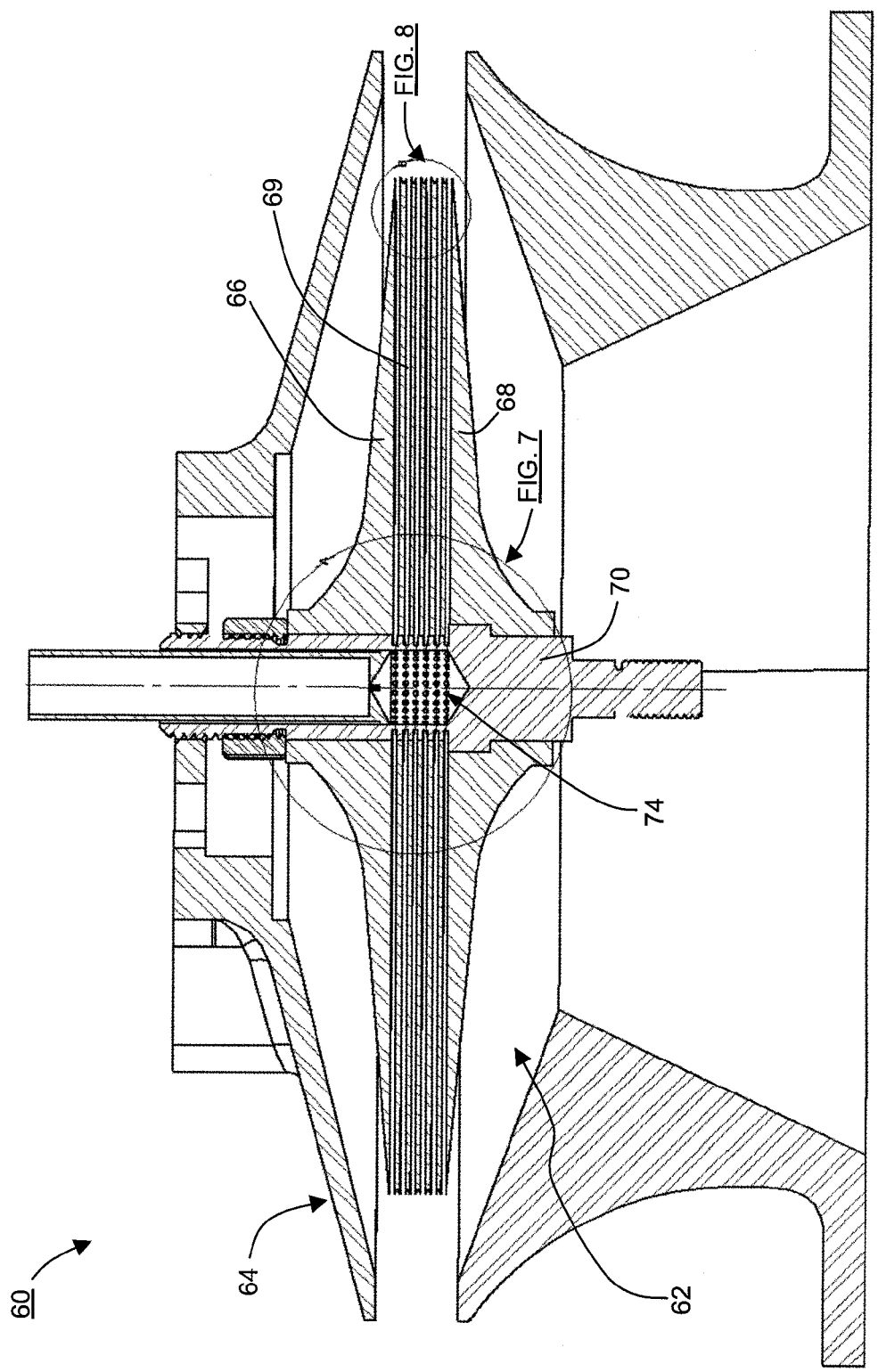
FIG. 6 is a cross-sectional elevation view of an apparatus according to another embodiment of the invention wherein the rotor assembly has seven rotor plates.
Figure 7:
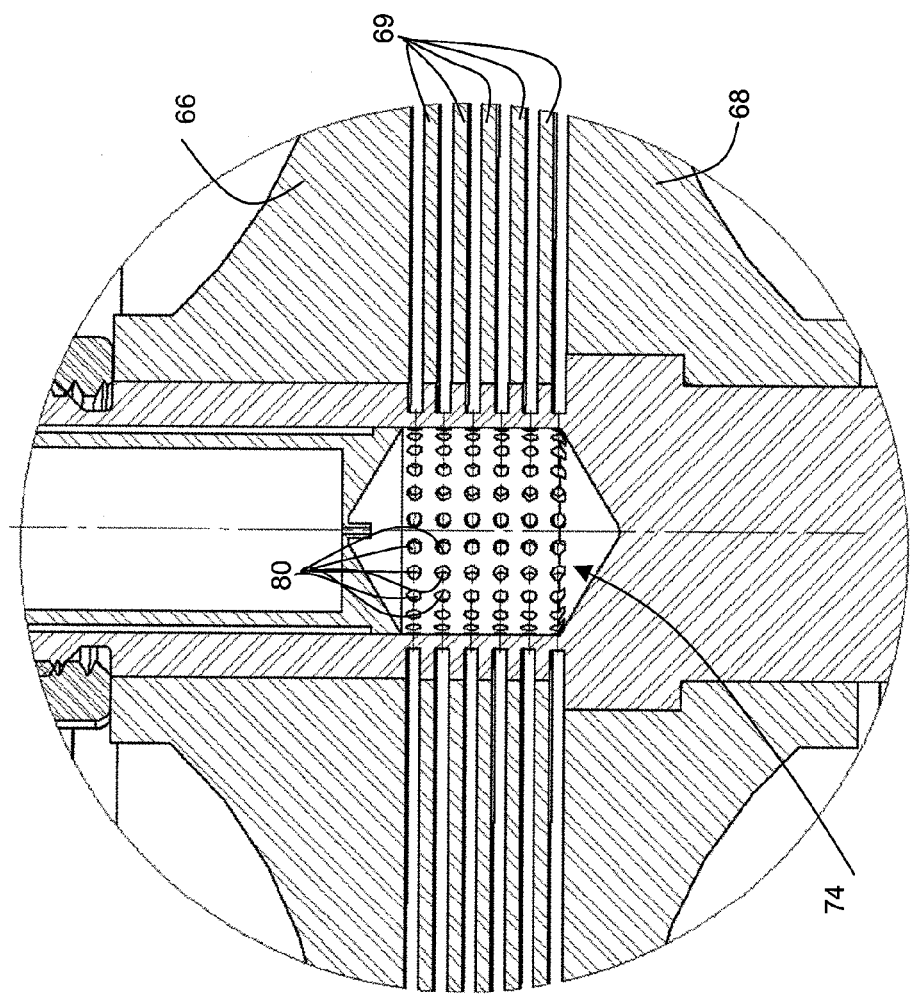
FIG. 7 is a close-up partial view of the apparatus of FIG. 6 showing the feed chamber in detail.
Figure 8:
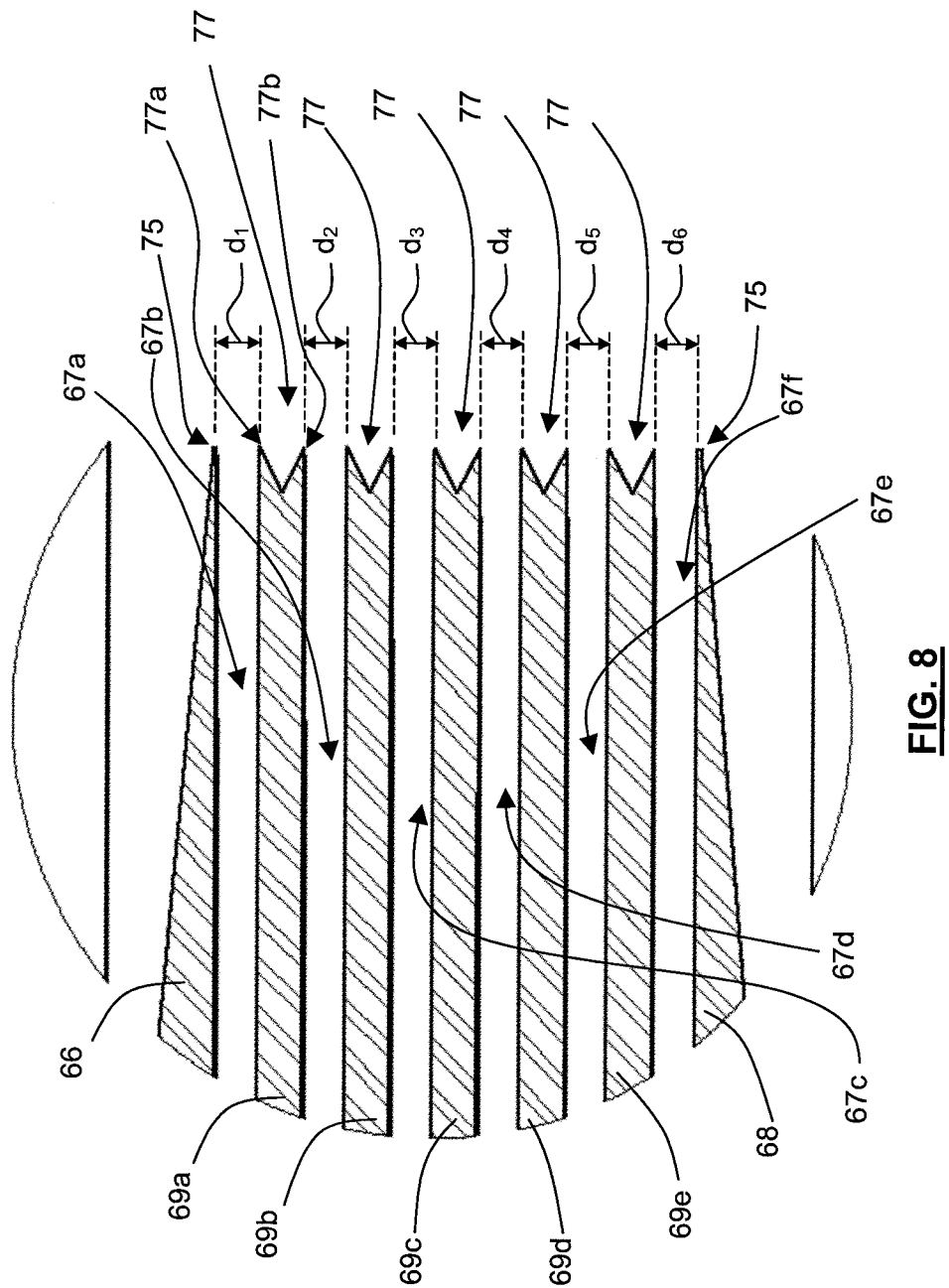
FIG. 8 is a close-up partial view of the apparatus of FIG. 6 showing the edges of the rotor plates in detail.
Figure 9:
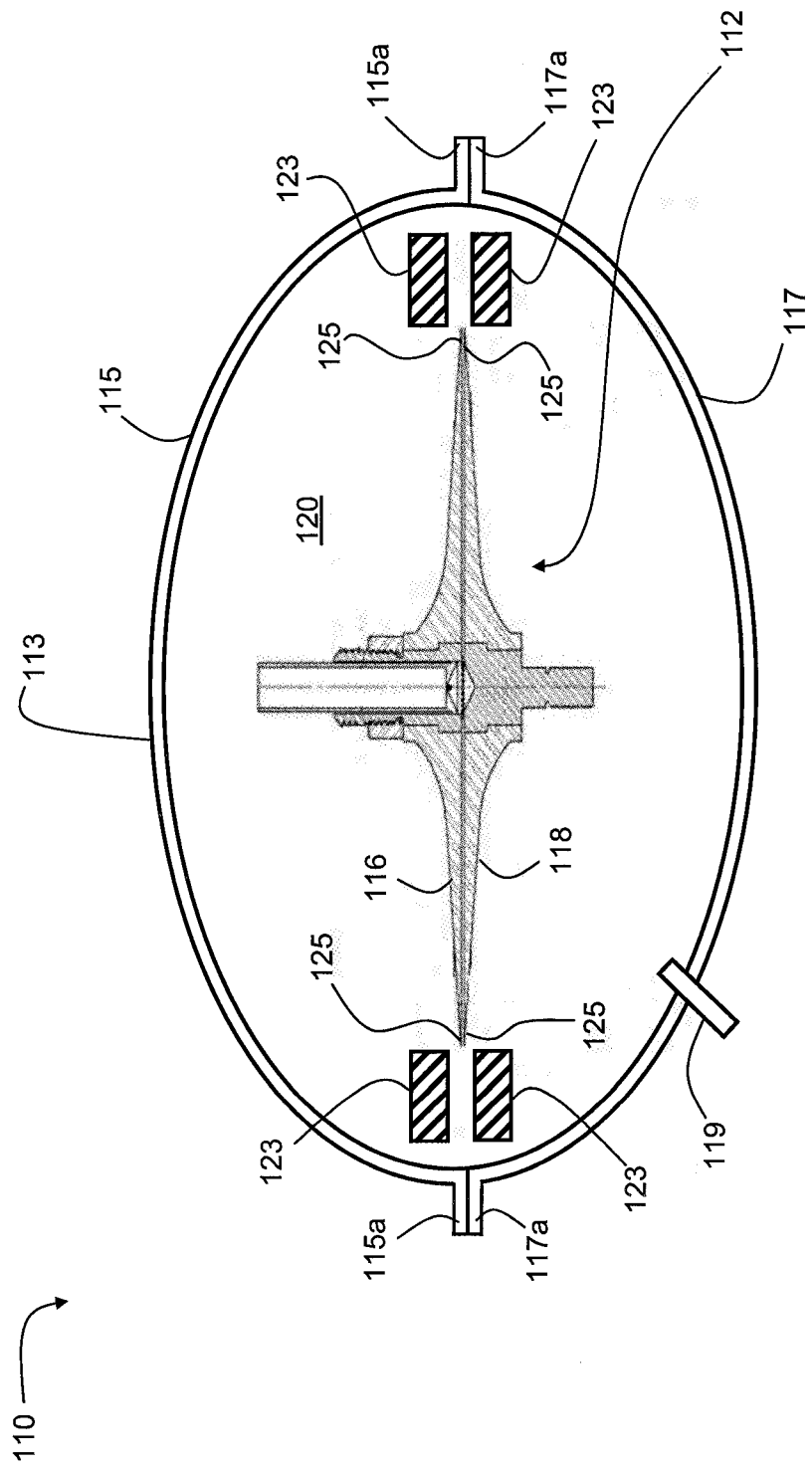
FIG. 9 is a cross-sectional view of an apparatus for producing particles according to another embodiment.

As shown in FIGS. 2 and 5, the upper portion 20a of the spindle 20 generally includes a hollow portion 22 configured to allow access to the feed chamber 24 so that the liquid can be provided therein. For example, the hollow portion 22 may be sized and shaped so as to receive a feed tube 26. The feed tube 26 may supply material to the feed chamber 24 in a liquid state at an input mass flow rate selected according to desired operating conditions.

The feed tube 26 may include a sealing member 28 configured to at least partially close the upper end of the feed chamber 24. For example, the sealing member 28 may slidingly engage the outer walls 23 of the hollow portion 22 so as to seal the feed chamber 24 and inhibit liquid in the feed chamber 24 from flowing back along the outside surface of the feed tube 26. As shown, the sealing member 28 has at least one feed hole 29 for allowing liquid material to be pumped from the feed tube 26 into the feed chamber 24.

In some embodiments, the feed tube 24 may remain stationary during rotation of the rotor assembly 12, in which case the sealing member 28 may slidingly engage the walls 23 in the hollow portion 22 of the spindle 20. In other embodiments, the feed tube 26 may be configured to rotate with the rotor assembly 12, in which case an upper end 26a of the feed tube 26 may be rotatably coupled to a liquid supply (not shown).

In some embodiments, as shown in FIG. 1 for example, the rotor assembly 12 may be received within a shroud assembly 14, as will be described in greater detail below.

Figure 3:
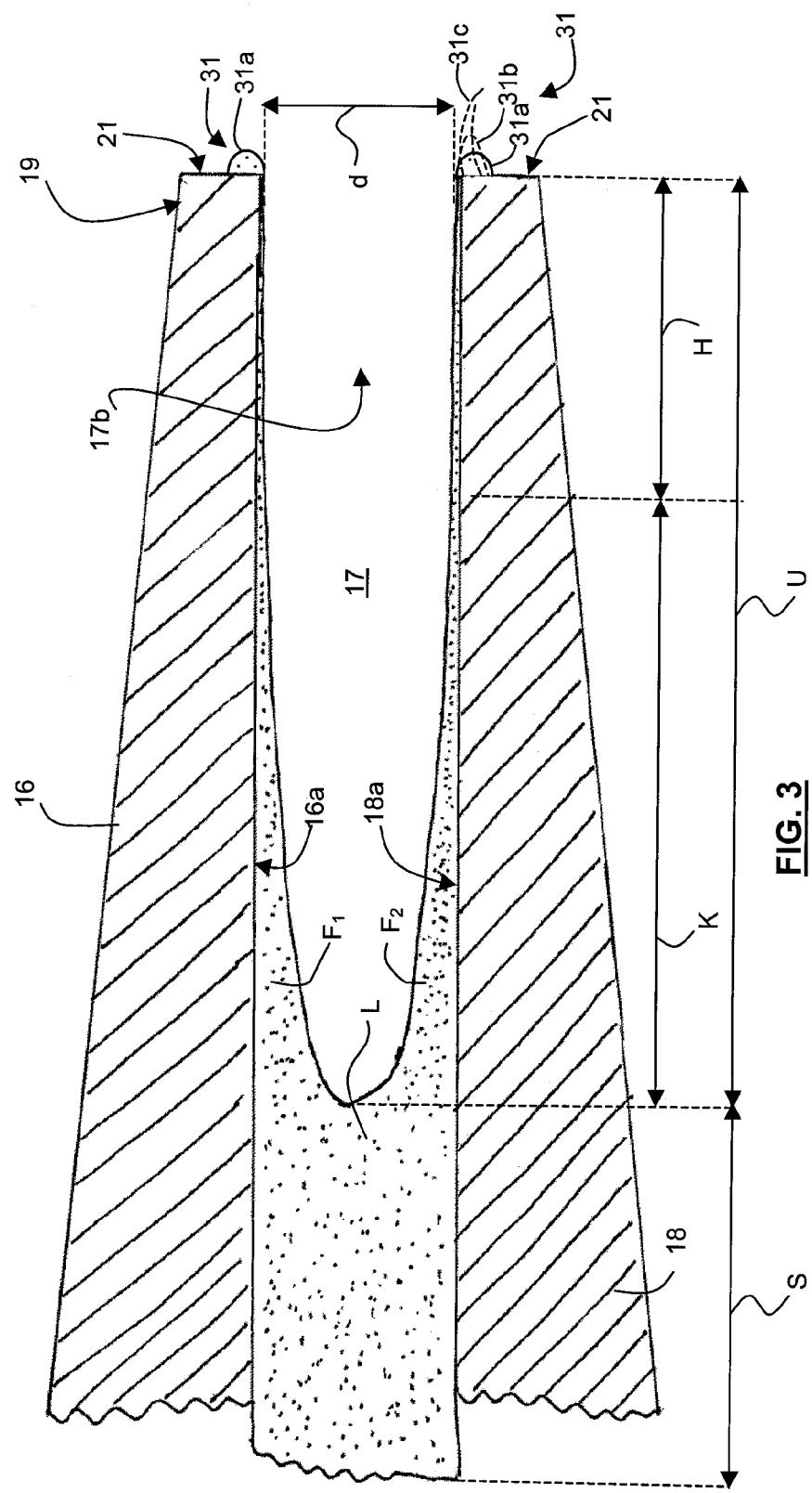
FIG. 3 is a close-up partial view of the apparatus of FIG. 1 showing rotor plates having blunt edges.
Figure 4:
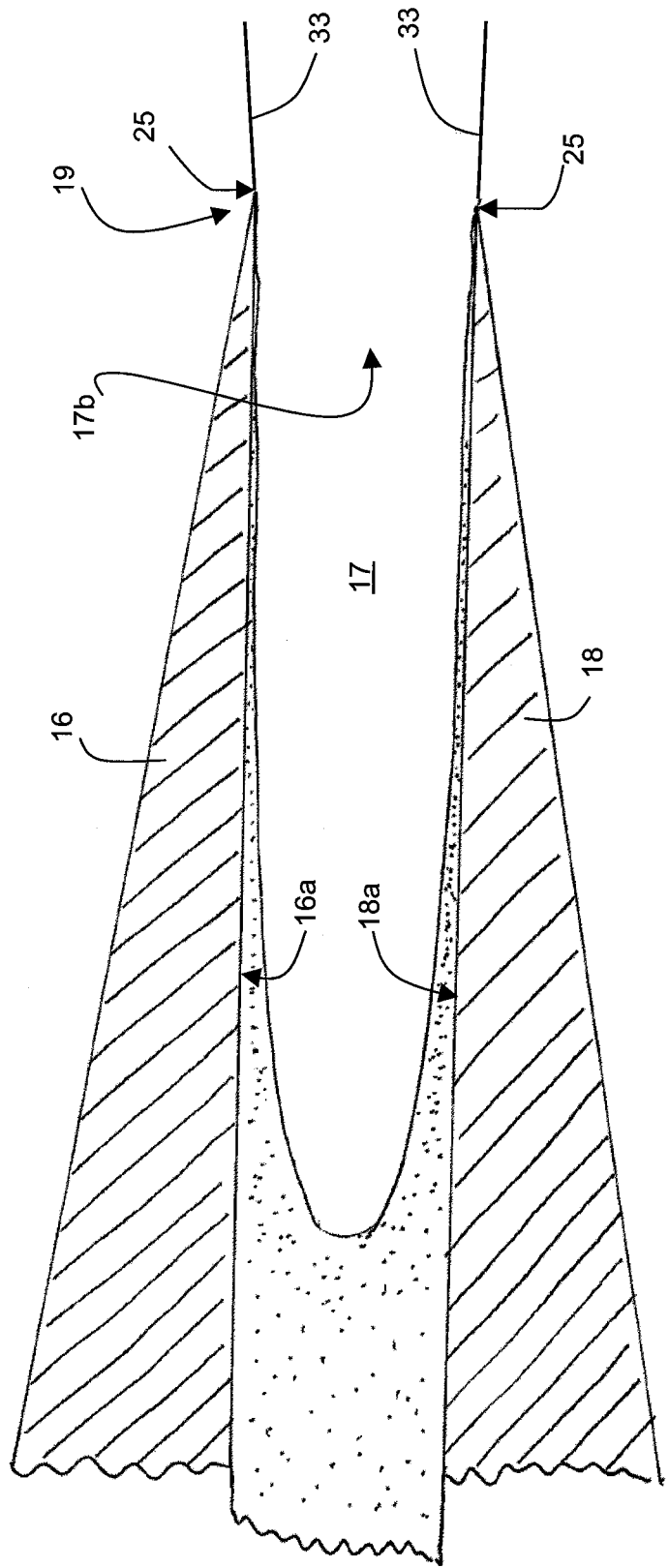
FIG. 4 is a close-up partial view of the apparatus of FIG. 1 showing rotor plates having sharpened edges.

Turning specifically to FIGS. 2 to 4, the rotor plates 16, 18 will now be described in further detail. As discussed, the rotor plates 16, 18 are rigidly coupled to spindle 20 and have opposing surfaces 16a, 18b spaced apart by the gap distance "d" so as to define the capillary 17 therebetween.

In the embodiment shown, the surfaces 16a, 18a are generally planar surfaces that are parallel to each other, with the axis of rotation A being normal (or perpendicular) to both surfaces 16a, 18a. In other embodiments, the surfaces 16a, 18a, may be non-planar (e.g. concave or convex). In yet other embodiments, the surfaces 16a, 18a may be non-parallel, and the gap distance "d" may vary at different locations within the capillary 17.

The gap distance "d" between the upper and lower surfaces 16a, 18a is not limited to any particular size, but may be selected so as to facilitate the formation of unsaturated liquid flow within the capillary 17. For example, in some embodiments, the gap distance "d" may be typically between approximately 5 and 2000 micrometers. In other embodiments, the gap distance "d" may be between approximately 50 to 1000 micrometers.

As shown in FIGS. 2 and 3, the capillary 17 generally has an inner region 17a adjacent the axis of rotation A and an outer region 17b generally distal from the axis of rotation A (e.g. towards the outer edges 19 of the surfaces 16a, 18a on the rotor plates 16, 18).

The inner region 17a of the capillary 17 may generally be in fluid communication with the feed chamber 24. For example, one or more apertures 30 may be provided in the sidewall 32 of the feed chamber 24. During use, the rotor assembly 12 may be rotated at an angular velocity selected so as to cause liquid in the feed chamber 24 to flow through the apertures 30 in the sidewall 32 and enter the inner region 17a of the capillary 17.

In some embodiments, the size, shape and number of apertures 30 may be selected so as to influence the rate of liquid flowing from the feed chamber 24 to the capillary 17. For example, the diameter or size of the apertures 30 may be increased or decreased, and/or a greater or lesser number of apertures 30 may be provided so as to change the rate of liquid flowing from the feed chamber 24 into the capillary 17.

In some embodiments, the apparatus 10 may be provided without a feed chamber 24, and liquid may be fed directly into the inner region 17a of the capillary 17 (e.g. using the feed tube 26 or any other suitable technique).

In some embodiments, as the liquid enters the inner region 17a, the liquid tends to continuously fill the inner region 17a such that the liquid may span the gap between the upper and lower surfaces 16a, 18a in that region. This is known as a "saturated" condition (also called "pore flow").

As the liquid flows through the capillary 17, moving outwardly from the inner region 17a towards the outer region 17b, the leading edge of the liquid (e.g. that portion of the liquid generally furthest from the axis of rotation A) tends to experience ever-increasing centripetal forces.

At some point within the capillary 17, the liquid may experience a transition from the "saturated" condition to an "unsaturated" condition wherein the liquid does not continuously span the capillary (e.g. the liquid does not span the gap between the upper and lower surfaces 16a, 18a). Various liquids may reach the "unsaturated" condition at different locations within the capillary 17 depending upon the liquid properties and operating conditions of the apparatus 10.

As shown in FIG. 3, a liquid L within the capillary 17 may transition from the "saturated" flow condition (indicated generally by S) in which the liquid L spans the capillary 17 between the upper and lower surfaces 16a, 18a, to the "unsaturated" flow condition (indicated generally by U) in which the liquid L is discontinuous and does not span the width of the capillary 17. For example, as shown in FIG. 3 the liquid L in the "unsaturated" condition exists as two independent and separate films, an upper film $F_1$ wetting the upper surface 16a and a lower film $F_2$ wetting the lower surface 18a.

The transition between the "saturated" condition S and the "unsaturated" condition U generally occurs when the liquid L wets the upper and lower surfaces 16a, 18a of the capillary 17 in a manner such that stable film flow commences. This usually happens when the centripetal gradient is such that the forces acting on the liquid L exceed the capillary forces sustaining saturated flow within the capillary 17, which occurs roughly when the centripetal force per unit area is greater than the surface tension of the liquid L multiplied by the cosine of the wetting contact angle of the liquid L on the surfaces 16a, 18a and divided by the size of the gap "d" of the capillary 17, as in Equation 1:

$$CF_a > \frac{\gamma \cos(\theta_c)}{d} \quad (1)$$

where $CF_a$ is the centripetal force per unit area, $\gamma$ is the surface tension of the liquid L, $\theta_c$ is the wetting contact angle of the liquid on the surface, and "d" is the gap size or gap distance. The relationship given in Equation 1 may be altered somewhat when comparing capillaries defined by a single surface (e.g. a capillary tube) with a capillary defined by two spaced apart surfaces (e.g. the surfaces 16a, 18a).

As discussed above, the increasing centripetal gradient within the capillary 17 generally causes the liquid L therein to transition from the "saturated" flow condition S to the "unsaturated" flow condition U. This transition may be further facilitated by the geometry of the capillary 17.

For example, as liquid L moves from the inner region 17a to the outer region 17b, the relative volume of the capillary 17 becomes progressively larger due to the increasing the surface area of the surfaces 16a, 18a (caused by geometric effects). Accordingly, the liquid L may experience additional spreading depending on the shape of the capillary 17.

When the volume and surface area of the capillary 17 increases with increased distance from the axis of rotation A, it is more difficult for the liquid to remain in the saturated condition (unless the liquid is moving much faster in the inner region 17a than in the outer region 17b, which is generally unlikely since the available centripetal force at the inner region 17a is much less than the available centripetal force at the outer region 17b).

For example, when the capillary 17 is provided between two plates 16, 18, this tends to further facilitate the transition from the "saturated" condition S to separated, "unsaturated" flow U. Accordingly, the upper and lower films $F_1$, $F_2$ that have formed on the upper and lower surfaces 16a, 18a of the capillary 17 undergo progressive thinning as the liquid L moves outwardly toward the edges 19 of the rotors 16,18.

These upper and lower films $F_1$, $F_2$ occur within the confines of the relatively narrow capillary 17, where the films $F_1$, $F_2$, tend to be protected from wind shear and other undesirable forces that could otherwise cause the formation of waves, ripples, and spray on the films $F_1$, $F_2$, or Bernoulli forces that would tend to lift the liquid films $F_1$, $F_2$ away from the surface of a spinning disc that was operating in open air (i.e. with no capillary), all of which could cause the uncontrolled formation of shot, fibrils, and other undesirable products.

As generally described above, when the liquid L (e.g. the upper and lower films $F_1$, $F_2$) reaches the edges 19 of the surfaces 16a, 18a of the capillary 17, the liquid films $F_1$, $F_2$ may accumulate at various points along the edges 19, become larger and elongated as additional liquid arrives, and eventually separate from the surfaces 16a, 18a so as form particles.

The stability of the liquid film at the edge of the capillary is usually no longer subject to significant instabilities because the thin film demonstrates strong adhesive forces with the surface and is no longer responsive to wind shear or turbulence, as was the case with the original bulk liquid.

Since the liquid L is in an unsaturated condition U, the size of the particles emerging from the capillary 17 is generally not controlled by the gap distance "d". This is in contrast to prior art devices that used one or more spinning orifices, in which the fluid was extruded through the orifices and the size of the particles was largely dependent upon the size of the orifices.

In contrast, the sizes of the generated particles according to the embodiments disclosed herein are generally controlled by the physics occurring at the edge of the rotating capillaries 17, and accordingly particles of much smaller sizes may be produced. That is, the droplets attached to the edge of the capillary define what are essentially "synthetic orifices" that release particles based upon a balance of surface tension vs. centripetal force. In most conditions, this results in the formation of an enormous number of droplet emitters of very tiny size and generally much smaller than can be drilled by mechanical means and in greater number and closer spacing than practical if machined.

Furthermore, the use of rotating capillaries allows particles to be formed in a controlled environment, with the transition from saturated to an unsaturated condition taking place within an environment where wind effects, vortices, turbulence, and other disturbances are greatly reduced or even eliminated. This is in contrast to prior art systems that used spinning disc in which the liquid was exposed to air shear and other liquid instabilities.

The type of particles formed (e.g. droplets or fibers) may depend largely upon the characteristics of the liquid L (e.g.

whether the liquid material is Newtonian or non-Newtonian, what the viscosity is at the operating temperature, etc.), but may also depend on other operating characteristics, such as angular velocity of the rotor assembly 12, the wetting properties of the surfaces 16a, 18a (which may be augmented by coatings and other surface treatments), and the shape of the edges 19.

In some embodiments, where the edges 19 are blunt edges 21 (as shown in FIG. 3), the liquid L will tend to accumulate at the blunt edge 21 as pools 31. The pools 31 may initially have a hemispherical shape (shown generally as 31a), but will tend to grow larger as a result of the progressive arrival of additional liquid through the upper and lower films $F_1$, $F_2$, which causes the relative curvature of the pools 31 to change.

In particular, the pools 31 may then begin to elongate and adopt an elliptical shape (indicated generally as 31b) and eventually the pools 31 will adopt a shape (shown generally as 31c) such that a portion of the liquid L in the pools 31 will begin to disengage from the blunt edge 21 to form particles (e.g. droplets or fibers).

In other embodiments, the adhesion of liquid L accumulating at the edges 19 can be altered by reducing or minimizing the available surface. For example, as shown in FIG. 4, the available surface for accumulation may be reduced by providing the edges 19 as sharp edges 25 (or razor edges). The sharp edges 25 tend to change the roughly two-dimensional blunt edge 21 shown in FIG. 3 into effectively a one-dimensional line.

When using a blunt edge 21, the surface tension of a liquid causes that liquid to adopt a roughly hemispherical shape in the absence of other forces (e.g. the hemispherical pools 31s as in FIG. 3). However, as shown in FIG. 4, when sharp edges 25 are used, the base of the "hemisphere" that would be formed is essentially confined to a single dimension. This collapses the adhesive stability of the liquid at the sharp edge 25 and centripetal forces, therefore, tend to eject the liquid as a particle 33 (e.g. a droplet or fiber) that is much smaller than is otherwise produced when using blunt edges 21.

In some embodiments, the particles 33 emerging from the sharp edge 25 may be very small (e.g. on the order of several nanometers), and accordingly the amount of any further attenuation necessary to achieve a target dimension for the particle 33 can be greatly reduced or in some cases even eliminated. However, it should be understood that for this to occur, the feed rate of fluid should be reduced in proportion to the smaller size of the particles being produced.

Sharp edges 25 with radii in the tens-of-nanometers may be possible using known sharpening and honing techniques. For example, in some embodiments, the sharp edges 25 may each have a radius of less than 100 nanometers. In some embodiments, the sharp edges 25 may each have a radius less than approximately 10 nanometers. Generally, the radii of the sharp edges 25 may be made as small as possible so as to form very fine particles.

In some embodiments, the use of the sharp edges 25 may impact the amount of liquid that can be fed to the rotor assembly 12 while maintaining suitable control of the size of the particles. Generally, the input mass flow rate or feed rate of liquid into the inner region 17*a* of the capillary 17 must be reduced roughly in direct proportion to the size of the emitted particles, so that the use of a sharp edge 25 may not be suitable for all applications (e.g. when high volumes of particles are desired).

In particular, in some embodiments it may be more advantageous to initially produce larger particles (e.g. larger fibers or droplets) at higher rates of production and then subsequently attenuate these particles using hot air shear, visco-elastic pulling, electrostatic methods (e.g. electrospinning), and/or other suitable attenuation techniques.

It is generally known in the art that liquids can be drawn and attenuated through the influence of a high-voltage electric field and when this field is sufficient, the liquid will be drawn between two surfaces with a large applied electrostatic field. When used to produce fibers, the liquid is typically a solution containing a polymer and the carrier liquid is often made to vaporize as the fiber is drawn to the alternate surface. This leaves a solid polymer fiber (often of micronic or nanometer size) and is generally known as electrospinning.

When a spinning rotor is electrically isolated and subjected to high voltage, and the fibers are allowed to collect on a grounded screen at a fixed distance, the fibers can be further attenuated to smaller diameter through the application of the electrostatic field.

In the electrostatic case, the spinning capillary can be used to generate small liquid droplets that form a "Taylor" surface under the influence of a high voltage potential between the spinning capillary and an adjacent surface, as will be understood by a person skilled in the art.

Another technique that may be used to facilitate the formation of an unsaturated liquid condition within the capillary 17 is to operate the apparatus 10 in a "starve feed" condition. In a "starve feed" condition, the potential mass flow rate of liquid that can be pumped by centripetal forces into the capillary 17 (and which ultimately separates from the edges 19 of the surfaces 16*a*, 18*a* to form particles) is greater than the actual mass flow rate of liquid provided to the inner region 17*a* of the capillary 17 (e.g. the actual mass flow rate of liquid being pumped via the feed tube 26).

When operating in a "starve feed" condition, the formation of a "saturated" condition in the liquid within the capillary 17 tends to be at least partially or even completely eliminated, and the liquid within the capillary 17 rapidly or even immediately adopts an "unsaturated" condition. For example, the liquid may be in the unsaturated condition immediately upon flowing from the feed chamber 24 into the inner region 17*a* of the capillary 17.

In some embodiments, each rotor plate 16, 18 can be provided as a generally flat disc having a diameter D (as shown in FIG. 5). The centripetal force present during rotation of the rotor assembly 12 tends to act along the main structure of the rotor plates 16, 18, which eliminates or reduces severe bending moments that may otherwise be present and could cause damage and/or severe deflection of a spinning disc.

In some embodiments, the diameters D of each disc are the same (or substantially similar) such that the edges 19 are generally in vertical alignment (as shown in FIGS. 3 and 4). In other embodiments, the diameter D of the upper plate 16 may be different from the diameter D of the lower plate 18.

In some embodiments, particularly for rotor assemblies 12 designed to operate at elevated angular velocities, the rotor plates 16, 18 may be constructed so as to minimize or reduce the weight and/or volume of the rotor plates 16, 18 away from the axis of rotation A of the rotor assembly 12. For example, the upper and lower plates 16, 18 may each have an outwardly tapering profile (as shown generally in FIG. 1).

The use of a rotor assembly 12 having at least one rotating capillary 17 therein tends to reduce some of the practical limits imposed on the input mass flow rate or feed rate of liquid being provided to the apparatus 10. Furthermore, while there may be restrictions related to the rate at which the liquid can be provided to the capillary 17, these may be mitigated by making appropriate modifications, such as increasing the size and/or number of apertures 30 in the feed chamber 24.

Since the liquid transitions to separate unsaturated films within the capillary 17 as the liquid approaches the edges 19 of the rotor plates 16, 18, the liquid is dispersed onto two surfaces 16a, 18b (rather than a single surface), and is ultimately separated from two edges 19 (rather than a single edge). This doubles the available surfaces available for producing particles and increases throughput as compared to a conventional spinning disc having a single spinning surface.

Furthermore, a plurality of rotating capillaries can be provided together as an array in one apparatus so as to increase throughput. For example, an apparatus 60 is shown in FIG. 6 according to another embodiment of the invention. The apparatus 60 generally includes a rotor assembly 62 that includes a stack of seven rotor plates (as best shown in FIGS. 7 and 8). The rotor assembly 62 is shown provided within a shroud assembly 64.

The stack of rotor plates includes an upper rotor plate 66, a lower rotor plate 68, and five intermediate rotor plates 69 (a first intermediate rotor plate 69*a*, a second intermediate rotor plate 69*b*, a third intermediate rotor plate 69*c*, a fourth intermediate rotor plate 69*d*, and a fifth intermediate rotor plate 69*e*).

The upper and lower rotor plates 66, 68 may be generally similar to the upper and lower plates 16, 18 described above. As shown, for example, the upper and lower rotor plates 66, 68 have sharpened edges 75 (similar to sharpened edges 25) and each rotor plate 66, 68 may have an outwardly tapered profile.

However, as shown in FIGS. 6 to 8, the intermediate rotor plates 69 may each have a different structure. For example, the intermediate rotor plates 69 may be provided as flat plates or discs (with no taper) that are rigidly coupled to a spindle 70.

Furthermore, in some embodiments, the intermediate rotor plates 69 may be provided with bifurcated edges 77, each having an upper edge 77*a* and a lower edge 77*b* that allow two separate particles streams to emerge from the upper edge 77*a* and lower edge 77*b*, respectively, of each plate 69. Each edge 77*a*, 77*b* may function to release particles as generally described above. In some examples the bifurcated edges 77 may be V-shaped (as shown in FIG. 8), U-shaped, or have any other suitable configuration.

This provision for two emitting surfaces (e.g. edges 77*a*, 77*b*) on each intermediate rotor plate 69 tends to double the potential for particle production and a stack of such plates increases particle production enormously as compared to a single flat disc or even a stack of discs that use a single surface.

In some embodiments, the bifurcated edges 77 may be sharpened similar to the sharp edges 25 so as to inhibit the formation of pools of liquids thereon.

In other embodiments, the edges of the rotor plates 66, 68, 69 may have various configurations to form particles of different sizes and shapes. For example, some intermediate rotor plates 69 could be provided with blunt edges 21, while other rotor plates 69 could have sharp edges 25 or bifurcated edges 77. In this manner, it may be possible to form particles having different sizes and shapes simultaneously using the rotor assembly 62.

As shown, the rotor plates 66, 68, 69 define a plurality of capillaries 67, including a first capillary 67*a* between the upper rotor plate 66 and the first intermediate rotor plate 69*a*, a second capillary 67*b* between the first intermediate rotor plate 69*a* and the second intermediate rotor plate 69*b*, a third capillary 67*c* between the second intermediate rotor plate 69*b* and the third intermediate rotor plate 69*c*, a fourth capillary 67*d* between the third intermediate rotor plate 69*c* and the fourth intermediate rotor plate 69*d*, a fifth capillary 67*e* between the fourth intermediate rotor plate 69*d* and the fifth intermediate rotor plate 69*e*, and finally a sixth capillary 67*f* between the fifth intermediate rotor plate 69*e* and the bottom rotor plate 68.

Each capillary 69*a*, 69*b*, 69*c*, 69*d*, 69*e*, and 69*f* has a corresponding gap distance $d_1$, $d_2$, $d_3$, $d_4$, $d_5$ and $d_6$. In some embodiments, the gap distances $d_1$, $d_2$, $d_3$, $d_4$, $d_5$ and $d_6$ may each be the same or be generally similar. In other embodiments, the gap distances $d_1$, $d_2$, $d_3$, $d_4$, $d_5$ and $d_6$ may vary. For example, a first gap distance $d_1$ may be selected so as to be greater than a second gap distance $d_2$, and so on.

As shown in FIG. 7, the apparatus 60 using stacked rotor plates 66, 68 and 69 may be provided with a modified (e.g. larger) feed chamber 74, which may include a greater number of apertures 80 (as compared to the number of apertures 30 in the feed chamber 24 described above) so as to provide sufficient liquid flow from the feed chamber 74 to the capillaries 67 during use.

By using stacks of rotor plates 66, 68, 69 in one rotor assembly 62, greatly increased feed rates of liquid may be converted into particles at a much higher rate. For example, in some embodiments, an apparatus using stacks of rotor plates can have as much as 1000 times greater rates of productivity as compared to a single rotating disc with a single liquid-dispersing surface, and may be able to easily handle kilogram/minute liquid flow rates while producing micron or nanometer size particles.

In some embodiments, the rotor assembly may be configured such that the diameter of the rotor times the rate of rotation may greater than 50,000 cm·RPM. In other examples, the rotor assembly may be configured such that this figure might be as high as 700,000 cm·RPM. In yet other examples, this figure might be higher than 700,000 cm·RPM.

In yet other examples, the angular velocity and plate diameter may be selected such that the diameter of the plate times the rate of rotation is between about 10,000 cm·RPM and 1.4 million cm·RPM.

Some of the embodiments described herein generally use geometrically flat rotating structures (e.g. rotor plates) where the resulting centripetal forces tend to be aligned with the main body of the plate. Accordingly, the rotor assemblies described herein can be generally configured to rotate at extremely high velocities, including speeds at which the velocity of the tip or edge of the rotor plates may be supersonic (e.g. exceeding the speed of sound).

In some embodiments, ejection of a particle (e.g. a ligament, fiber or droplet) from the surface of a rotating capillary and into the high-speed jet of air emerging from the tip or edge of the rotor plates can lead to attenuation of the ligament or fiber into an elongated and more narrow fiber.

Alternatively, air can be injected into a surrounding cowling and emerge at a roughly coaxial direction to the ligament, fibers or droplets. For example, the path of air flowing is shown generally as $A_F$ in FIG. 1. When this sheath of coaxial air is heated, the fiber can be further stretched and elongated while remaining sufficiently hot to remain capable of being attenuated.

Alternatively, at extremely high liquid feed rates, a continuous film may be emitted from the surfaces of the capillaries, which can be converted (or fibrillated) by interacting this film with one or more jets of air, and/or with a shock wave formed at the tip or edge of the rotor plates (when operating in the supersonic regime), and/or through air-shear induced vibrations taking place at the outer region of the capillary, and within the air outside of the capillary.

This continuous or "burst film" mode of operation tends to lead to the formation of particles or fibers with a poly-disperse range of diameters and lengths, but generally within the micronic or high nanofiber size range. One major advantage provided by this operating mode is that very high volume of product particles may be produced.

In some embodiments, energy consumption when using a rotating capillary apparatus tends to be lower than for a corresponding spinning disc operating in open air. In particular, during rotation of either a capillary rotor assembly or a simple disc, friction losses result from drag operating upon the upper and lower surfaces of the spinning structure. In the case of a spinning rotor assembly as described herein, at least two surfaces emit particles, while the drag on the rotor assembly is generally the same or similar to the drag on a simple spinning disc with only a single useful surface and thus half the available production capacity. Furthermore, by providing a stack of rotor plates in a rotor assembly, the number of emitting surfaces can be greatly increased with only a minimal increase to the drag forces experienced by the rotor assembly.

In some embodiments, as the rotor assembly may be rotated at very high angular velocities, powerful jets of air may be created by the interaction between the air and the rotor assembly. These jets of air may be useful tools for attenuation of the particles emitting from the surfaces (i.e. evaporating a liquid carrier or elongating a fiber). In some embodiments, supplemental jets of hot air may no longer be required to obtain desired levels of attenuation of the particles.

In other embodiments, these jets of air may be used to mitigate the need to compress air for attenuation, eliminating or greatly reducing the associated energy consumption.

In some embodiments, the rotor assembly 12 can be operated within the shroud assembly 14, which may be useful for controlling the airflow surrounding the rotor assembly 12. For example, this airflow may be used to control the attenuation of particles separating from the surfaces 16a, 18b, for drying droplets, cooling of droplets and/or fibers, interacting the particles with a controlled atmosphere during the production of sensitive materials, and other benefits.

The shroud assembly 14 generally includes an upper shroud 13 above the rotor assembly 12 and a lower shroud 15 below the rotor assembly 12 (and which may be used to secure the shroud assembly 14 to a ground surface).

In some embodiments, the shroud assembly 14 may be configured to help control interactions between the particles as they separate from the edges of the surfaces and the surrounding atmosphere. The shrouds 13, 15 may also serve to protect the rotor assembly 12 during use, and/or protect operators of the apparatus 10 from injury that could be caused by contacting the rotor assembly 12 and/or the particles emerging from the rotor assembly 12.

The shrouds 13, 15 may be spaced apart at their peripheral edges by an opening having a height T (as shown in FIG. 1). The height T is selected to allow the particles produced by the rotor assembly 12 to be ejected into the space outside the shrouds 13, 15 so that the particles can be collected.

In some embodiments, the shroud assembly 14 may be useful for sustaining the rotor assembly 12 within a heated environment to maintain the rotor assembly 12 at elevated temperature and to encourage the release or separation of particles from the edges 19 of the surfaces 16a, 18a into a high-speed jet of air (generally at elevated temperatures) for attenuating the particles (e.g. stretching and elongating the particles while tending to make them more narrow).

The resulting particles may then emerge from the shroud assembly 14 (e.g. through the opening between the upper shroud 13 and the lower shroud 15) into a cooler, low-velocity air stream outside of the shroud assembly 14. Here, the particles may be collected (for example by applying a vacuum to collect the particles as a flat non-woven sheet or as a roving, or by passing the air carrying the particles to centrifugal separators or barrier filters for collection).

In some embodiments, the shape of the shroud assembly 14 can be selected so as to help control the ingression of cold air into the shroud assembly 14 and/or to sustain a generally organized flow of hot or warm air around the particles as they separate from the surfaces 16a, 18a.

In some embodiments, the upper and lower shrouds 13, 15 may be shaped in cross section as a generally converging nozzle (as shown, for example, in FIG. 1). During use, air may be drawn into the shroud assembly 14 (e.g. through one or more openings 13a in the upper and lower shrouds 13, 15 as shown in FIGS. 1 and 5) and then the air may be accelerated through the opening between the upper and lower shrouds 13, 15.

In other embodiments, the upper and lower shrouds 13, 15 may be shaped in cross section as a contracting-expanding Laval nozzle. For example, the use of a Laval-nozzle type configuration may be desirable when operating at supersonic air speeds within the shroud assembly 14.

Such nozzle-type designs may be configured to surround the outer region of a rotating capillary tube, or may be adapted to surround the rotor assembly 12 having spinning rotor plates 16, 18. Provision of heated air, chilled air, a controlled atmosphere, or otherwise controlled fluid medium around the rotor assembly 12 may be possible under these conditions.

To achieve the high angular velocities that are generally useful in forming particles, the apparatus 10 should generally be robust to handle the significant forces that are generated during the rotation of the rotor assembly 12, and be configured to supply the torque needed to overcome drag forces acting upon the rotor assembly 12 when rotating.

Any drive system used with the apparatus 10 should also provide the torque needed to "pump" the liquid from the inner region 17a of the capillary 17 (where the liquid has minimal kinetic energy) to the outer region 17b of the capillary 17 (where the liquid has been accelerated to a very high velocity).

In some embodiments, a commercially useful drive should supply levels of horsepower sufficient to achieve rotor assembly speeds of between about 30,000 and 100,000 revolutions per minute (RPM). For example, in some embodiments a drive motor capable of producing between about three to five horsepower may be suitable. In other embodiments, a drive motor capable of producing up to ten horsepower may be suitable. In yet other embodiments, larger drive systems may be used to provide the even higher torque values necessary to handle the high liquid volumes associated with high throughput machines (for example, where the rotor assembly includes stacks of rotors).

One suitable drive system may be a turbine from a car or truck turbo compressor. Another suitable drive system may be similar to a commercially available air-turbine based upon the May spinning disc (as generally described for example in Gussman, R. A., "A Further Development of the May Spinning Top Aerosol Generator", Am. Ind. Hyg. Assoc. J. 42: 208 (1981), and other related literature), but scaled up to larger sizes to provide the desired torque levels. Other suitable drive systems may include high-frequency and/or asynchronous electric motors.

Each of these drive systems may have advantages and disadvantages depending upon the target speed and torque required for a particular apparatus. For example, automotive turbo compressors are generally the least expensive systems and are capable of supplying significant torque at very high rotational speeds. Because they are mass-produced, they are economical drive systems suitable for large-scale production where many machines may be required.

In some embodiments, with the rotor assembly 12 within a suitably configured shroud assembly 14, it may be possible to achieve a condition where the speed of rotation of the rotor assembly 12 is sufficient to cause self-heating of the rotor assembly 12 due to drag forces between the rotor assembly 12 and the surrounding air.

For example, air moving adjacent to the rotor assembly 12 may be heated by friction, which can raise the temperature of the rotor assembly 12 and the liquid in the feed chamber 24 and/or capillary 17. In some embodiments, depending on operating speeds and other conditions, it may be possible to raise the temperature of the rotor assembly 12 and the liquid by as much as 150° Celcius or more.

A rotor assembly 12 operating within a suitably configured shroud assembly 14 under such conditions may be called a "fully balanced machine" (FBM). In an FBM, there may be no need to provide supplemental compressors, heaters, or blowers to accomplish the desired production of particles. In particular, in a FBM, the liquid material (e.g. heated polymer, molten glass, etc.) that is fed to the rotor assembly 12 generally sustains a desired operating temperature and molten condition as a result of the self-heating of the rotor assembly 12. FBMs are generally possible when the rotor assembly 12 is of sufficient size and is rotated at very high speeds.

To operate in this FBM mode, the structural integrity of the rotor assembly 12 should be very high to resist the large centripetal forces that will be generated. In many cases, tip speeds of the edges 19 in a FBM may approach or even exceed sonic velocities.

For example, the rotor assembly 12 may be provided with rotor plates 16, 18 each having a diameter D of 15 cm, and being rotated at approximately 90,000 revolutions per minute. Accordingly, the speeds at the edge 19 of the rotor plates 16, 18 will be approximately 700 m/s, greater than the speed of sound.

In some embodiments, suitable liquids may include melt-spinnable fiber forming polymers, such as polyolefins, for example polyethylene polymers, polypropylene polymers and copolymers, polyesters, liquid crystal polymers, polyamides (e.g. nylon), polyaramids, polycarbonates, acrylics, and so on. In other embodiments, molten glasses, molten metals, pure liquids, emulsions, suspensions, solutions and generally any other suitable materials may be provided as the liquid to form particles.

In some embodiments, the edges 19 of the rotor plates 16, 18 may become deflected outwardly (generally away from each other) during rotation and thus be separated by a distance during rotation greater than the gap distance "d" when at rest. In such embodiments, this deflection of the rotor plates 16, 18 may be beneficial as it may tend to bias the trajectory of the particles outwardly and away from each other.

When there is a stack of rotor plates (e.g. as in the apparatus 60), generally only the upper rotor plate 66 and bottom rotor plate 68 will experience this deflection, as the intermediate plates 69 are usually not tapered.

In some embodiments, after separating from the capillary, the particles may be subjected to subsequent mixing with a gas or other material. For example, liquid droplets separating from the capillaries may be mixed with at least one gas. In one example, water droplets may be mixed with carbon dioxide so as to produce carbonated water. In another example, a liquid fuel (e.g. gasoline) may be mixed with oxygen, and the mixture may be subsequently ignited in a combustion chamber.

In some embodiments, the gas may include pollutants entrained therein, and the mixing may be used to remove the pollutants therefrom.

In other embodiments, emitted liquid droplets may be subjected to a vacuum configured so as to freeze dry the droplets. This may be useful, for example, for drying food products (e.g. coffee, milk) and/or pharmaceutical products. A vacuum can also be used to remove a volatile component from the droplets to leave lower volatility material. One example is the removal of free and dissolved water from lubricating and hydraulic oils.

In some embodiments, the droplets may be mixed with a heated gas so as to spray dry the droplets.

In some embodiments, the emitted particles may be subjected to one or more of a vacuum, a heating step, a cooling step, and/or exposure ionizing radiation. Such exposure can be used to initiate or stop a chemical reaction or carry out a purification or separation of one droplet component form another.

In some embodiments, the liquid may be a melted polymer, and the polymer may be mixed with a gas having activated carbon particles entrained therein so as to form a carbon-polymer composite. In some examples, the carbon can be mixed or replaced with other particles such as zeolites, absorbents, silicates, aluminas, minerals, ceramics, glass, beads, or any other particulate medium that can entrained into the air carrying the particles emerging from the spinning rotor.

In yet other embodiments, the apparatus and methods described herein may be useful for emulsifying or homogenizing at least two immiscible liquids with or without the use of an emulsifying agent. For example, two or more immiscible liquids can be provided within the inner region of one or more rotating capillaries. By rotating the capillaries at sufficiently high angular velocities, the two or more immiscible liquids can be subjected to extremely high shear forces as they move outwardly to the outer region.

These extremely high shear forces can cause the immiscible liquids to mix together (and may generally promote mixing and/or chemical reaction or polymerization of other chemicals at very high rates). In this manner, the apparatus and methods described herein may be useful as a homogenizer for milk and milk products, or for producing fine dispersions and emulsions.

In some embodiments, the apparatus and methods described herein may be used to generally promote mixing of two or more materials, and/or to generally encourage chemical reactions between two or more materials, especially when the reactants are not miscible and require a large surface area between the two fluids to promote the desired interaction. Alternatively, such a process can be used to promote liquid-liquid extraction processes where a constituent in one liquid is caused to be transferred to a second liquid, but where such transfer requires intimate mixing of the two liquids.

The various examples and embodiments described herein generally provide for greatly increased fluid throughput as compared with prior art systems. For example, some prior art systems use arrays of needles having narrow openings and extrude particles therethrough to generate particles. Normally, the liquid in such systems includes a substantial solvent that must be removed to obtain a finished product. For example, a system using approximately 20,000 needles and processing 20 L/hour of liquid will only be able to produce about 1.2 to 2 L/hour (or approximately 1 kg/hour) of particles.

However, when running an apparatus as described herein, much greater flow rates are generally possible. For example, an apparatus similar to apparatus 60 may be operated with a stack of ten rotor plates. When operating such an apparatus with the rotor plates having sharp edges, it may be possible to produce 20-50 grams of nano-size particles per minute. Furthermore, when operating such an apparatus with blunt edges, it may be possible to produce approximately 200 grams of nano-size and micronic-size particles per minute. Finally, when operating such an apparatus in a "burst film" mode, it may be possible to produce on the order of 1 kg of micronic particles per minute.

Accordingly, the apparatus as generally described herein can produce particles at much greater rates as compared to prior art systems.

Generally, the particles being emitted from the edges of the spinning rotors tend to follow Stokes' law as they move towards the wall of the surrounding chamber. Accordingly, the particles being emitted tend to decelerate and come to rest at a radial distance from the edge of the rotors, depending on their relative size. For example, larger particles tend to travel further from the edge of the rotors, while smaller particles tend to come to rest closer to the edges of the rotors (even though the smaller particles are often initially traveling faster than the larger particles).

The distance to the wall surrounding the rotors may be selected so that the particles exiting the rotor are suspended in the surrounding gas to provide extended contact time. Thus, as the particles are made smaller and smaller, the diameter of the chamber surrounding the rotors can be made smaller.

Furthermore, by emitting particles of different sizes, it may be possible to substantially fill the chamber with emitted particles.

In some embodiments, the liquid may have dielectric properties, and may include for example one or more dielectric materials. In such cases, the dielectric liquid may have polarizable properties (e.g. the molecules of the liquid may be polarizable but need not be not charged and therefore the liquid may not beconductive at a macroscopic level). Such a dielectric liquid can then be exposed to a non-uniform electrical field as the liquid separates from the capillary surfaces to form particles. For example, a suitable liquid could include polystyrene microbeads or other suitable polymers.

Generally, this process may be referred to as "dielectrophoretic spinning". Dielectrophoretic spinning tends to provide more aggressive spinning, which may further attenuate the particles, allowing even smaller particles to be formed. For example, while using some of the other embodiments it may be possible to produces particles on the order of one micrometer in diameter, using dielectrophoretic spinning may allow even smaller particles to be generated using a comparable apparatus (e.g. particles on the order of fifty nanometers could be generated), in some cases in a continuous manner.

In some embodiments, dielectrophoretic spinning may allow rotor assemblies as described herein to be rotated as slower speeds while still providing for comparable or even smaller particle sizes.

In some embodiments, the liquid may be a mixture that includes a first desired component (e.g. desired polymer, such as polystyrene) and a suitable solvent (e.g. hexane, water, chloroform, etc.) that is compatible with the desired component.

In some embodiments, one or more of the rotor plates or discs (e.g. rotor plates 16, 18) used in dielectrophoretic spinning may be made of a metal. In some embodiments, one or more of the rotor plates may be made of a dielectric material.

Turning now to FIG. 9, illustrated therein is an apparatus 110 for forming particles according to another embodiment.

In this embodiment, the apparatus 110 includes a rotor assembly 112 having surfaces that define at least one capillary therein (e.g. a pair of upper and lower rotor plates 116, 118). The rotor assembly 112 is generally providing in a sealed tank 113, which could include an upper housing 115 and a lower housing 117. Generally, the housings 115, 117 may include flange members 115*a*, 117*a* so that the housings 115, 117 can be sealed together (e.g. using bolts or other suitable fasteners).

When the tank 113 is sealed, it generally defines an air-tight chamber 120. Air or other gases in the chamber 120 can be evacuated form the chamber 120 by using a valve 119 coupled to a vacuum pump (not shown) to reduce the atmospheric pressure and create at least a partial vacuum in the chamber 120.

Accordingly, the rotor assembly 112 can be used to form particles as generally described herein while operating in at least a partial vacuum. This tends to reduce or greatly eliminate air resistance encountered by the particles as the separate from the surfaces of the rotors plates 116, 118. which can allow for further attenuation of the particles, as the particles will tend not to be slowed by contact with air or other gases. This can also allow the temperature of the particles to remain higher, as convective heat losses from the particles can be reduced or eliminated. As a result, this may lead to particles of smaller sizes.

In some embodiments, the atmospheric pressure within the chamber 120 may be in the range of about 100 kPa to 3 kPa. In some embodiments, the atmospheric pressure within the chamber 120 may be in the range of about 3 kPa to 100 mPa. In some embodiments, the atmospheric pressure within the chamber 120 may be less than 100 mPa In some embodiments, the atmospheric pressure within the chamber 120 can be reduced as much as possible to minimize the amount of air resistance and heat loss experienced by the particles.

In other embodiments, the atmospheric pressure within the chamber 120 may elevated so that it is greater than atmospheric pressure. This may provide for less attenuation and increased heat transfer, which may be desirable in some embodiments.

In some embodiments, as shown in FIG. 9, one or more heaters 123 may be provided near the edges 125 of the rotor plates 116, 118. The heaters 123 may be used to increase the temperature of the particles as they separate from the surfaces of the rotor plates 116, 118 (or at least inhibit the particles from cooling or slow their rate of cooling). This may allow for further attenuation of the particles, and may result in smaller particle sizes.

In some embodiments, the heaters 123 may be operated at a temperature at or near the operating temperature of the rotor assembly, the temperature of the liquid or the particles. In other embodiments, the heaters 123 may be operated at temperatures lower than or higher than the operating temperatures of the rotor assembly, the temperature of the liquid or the particles.

In various embodiments, the heaters 123 may be used to maintain the temperature of the particles, elevate the temperature of the particles, or at least slow the cooling rate of the particles.

In some embodiments, the heaters 123 can be used with the apparatus 100 wherein the rotor assembly 112 is operating in at least a partial vacuum (e.g. when the atmospheric pressure within the chamber 120 is reduced).

In other embodiments, the heaters 123 may be used in combination with an apparatus that is not operating in a partial vacuum, such as the apparatus 10 as generally described above, or the apparatus 100 when operating without a vacuum in the chamber 120.

In some embodiments, the heaters 123 may have an annular or ring shape that surrounds the rotor assembly 112. For example, where the rotor plates 116, 118 have a diameter of about six inches, the heaters 123 may be ring shaped with an inner diameter of about six inches and an outer diameter of about twelve inches.

Figure 10:
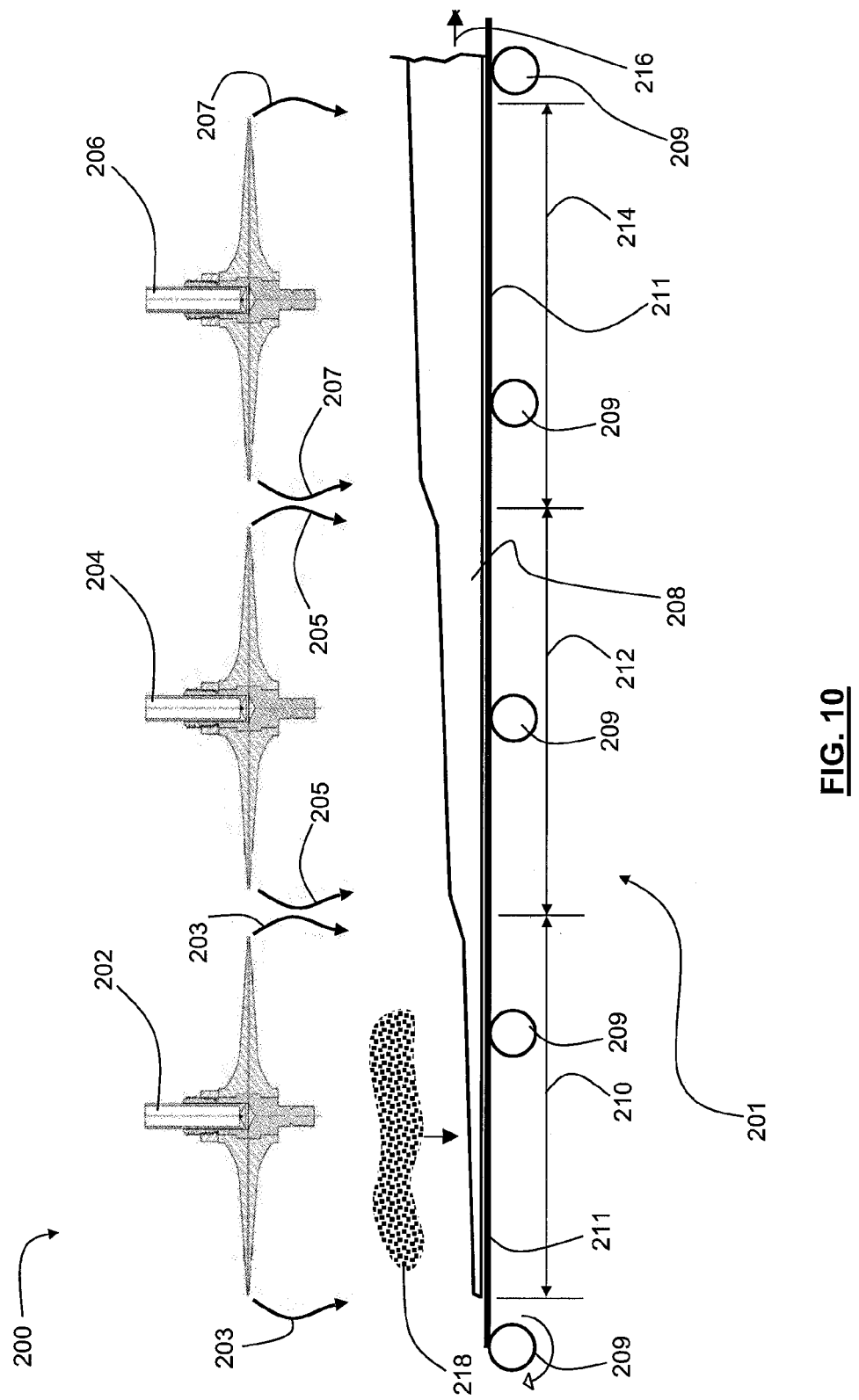
FIG. 10 is a schematic view of a system for producing a product according to another embodiment.

Turning now to FIG. 10, illustrated therein is a system 200 according to another embodiment for producing a product incorporating particles. The system 200 includes at least one apparatus forming particles from a liquid, and which may be arranged in a particular pattern or sequence.

For example, as shown the system includes 200 a first apparatus 202, a second apparatus 204, and a third apparatus 206. Each apparatus 202, 204, 206 may be similar or the same as the various apparatus as describe above (e.g. apparatus 10).

The system 200 also includes a collection device 201 for collecting the particles from the apparatus 202, 204 and 206. As shown, the collection device 201 could include a plurality of rollers 209 that drive a conveyor 211. In some embodiments, the conveyor 211 may be generally movable in a first direction (indicated generally as 216). In other embodiments, the conveyor 211 may be movable in multiple directions (e.g. back and forth).

Generally, the system 200 is configured to allow a product 208 to be generated using particles from the various apparatus 202, 204 and 206.

For example, the first apparatus 202 can be used to deposit first particles (indicated generally as 203) in a first region 210 of the conveyor 211, the second apparatus 204 can be used to deposit second particles (indicated generally as 205) in a second region 212 of the conveyor 211, and the third apparatus 206 can be used to deposit third particles (indicated generally as 207) in a third region 214 of the conveyor 211.

In some cases, air may be used to assist with the movement of the particles 203, 205, 207 onto the conveyor 211.

As the conveyor 211 moves the product 208 in the first direction 216, the product 208 thickness will tend to increase as additional particles are added from the various apparatus 202, 204, 206. Accordingly, the resulting product 208 tends have a smooth mix or blend of particles 203, 205, 207 from the various apparatus 202, 204, 206.

In some embodiments, the first, second and third particles 203, 205, 207 may be particles of various sizes, or materials, or both. In this manner, the resulting product 208 may be manufactured to incorporate particles of different sizes or materials, or both.

For example, the first particles 203 may be very small particles (e.g. less than two micrometers in diameter), the second particles 205 may be somewhat larger (e.g. between two micrometers and five micrometers in diameter) and the third particles may be larger still (e.g. between five micrometers and fifteen micrometers in diameter). Accordingly, as shown in FIG. 11, the resulting product 208 will tend to have a smooth gradient of particle density, ranging from smaller particles 203 on a first side 208*a* to medium particles 205 near the middle 208*b*, and eventually larger particles 207 on the other side 208*c*.

However, in contrast with conventional manufactures, which may include distinct layers of differently sized particles that are formed and then joined together, the product 208 is formed as a continuous member. Thus, as shown in FIG. 11, the particles of different sizes 203, 205, 207 tend to be "blended" or "mixed" through the thickness of the product 208. This may provide for good structural stability (e.g. it may inhibits de-lamination, which may be a problem in conventional manufactures) and may also provide for improved performance in various applications.

For example, the gradient-density product 208 may be very useful as an air filter, as an acoustic barrier, for chemical and particulate interception, as an absorbant material, as thermally insulating material, and so on.

Figure 11:
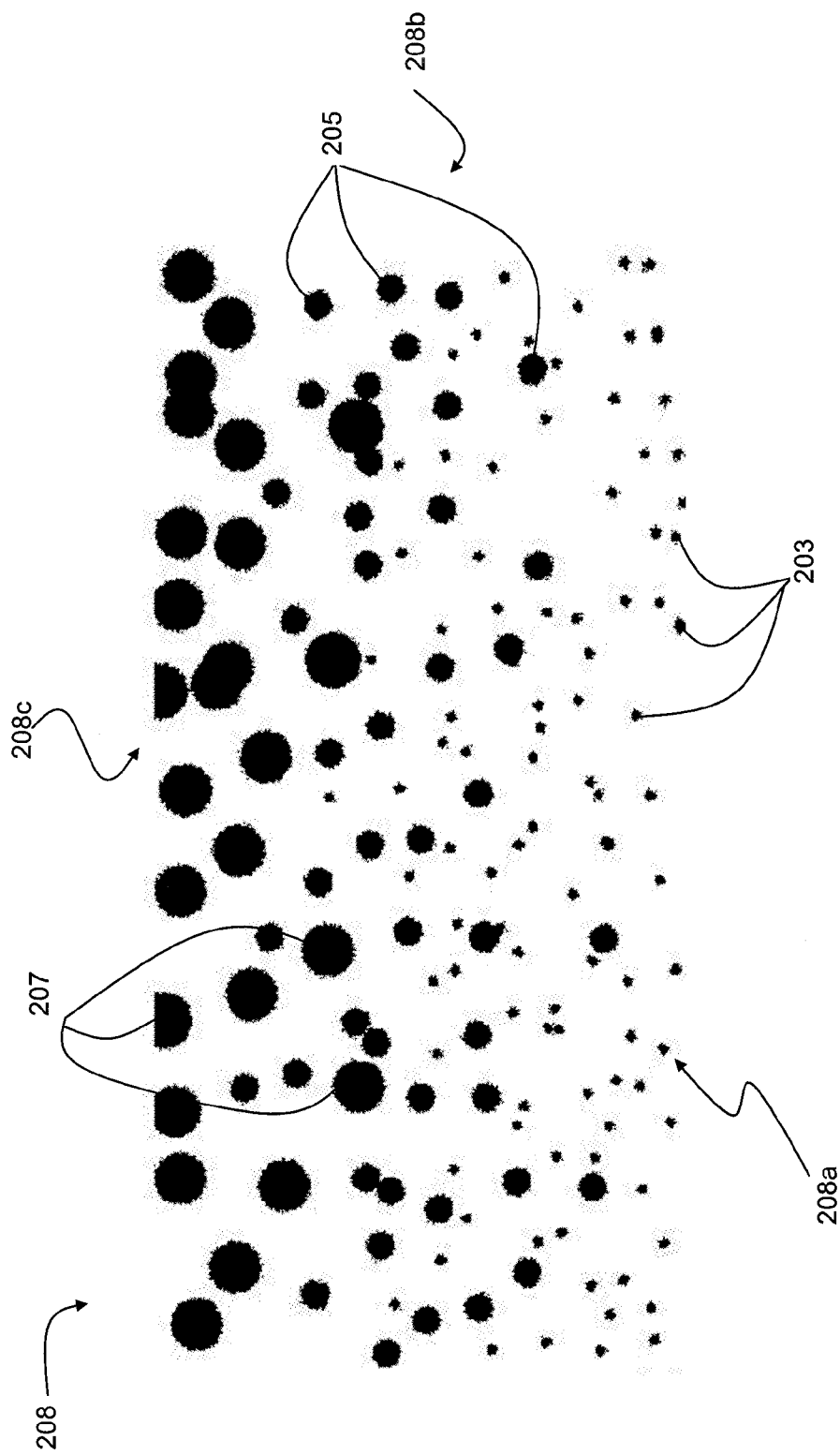
FIG. 11 is a schematic cross sectional view of a gradient density product according to one embodiment.

In particular, the gradient density product 208 as shown in FIG. 11 may function well at trapping air particles across its thickness. Incoming air may be entrained on the first side 208*a* (with the smaller particles 203) and then be slowed as is moves through the product 208 to the opposite side 208*c* (where the larger particles 207 are more prevalent). Since the particles 203, 205, 207 in the product 208 tend to be evenly blended in a smooth gradient (e.g. with particles of different sizes being interleaved or overlapping with each other), this helps to ensure that contaminants in the air are distributed evenly throughout the product 208 based on the size of the contaminants (e.g. larger particles are caught sooner, while smaller particles penetrate deeper into the product 208) and thus tends to inhibit the product 208 from becoming clogged at "hot-spots", and increasing dirt holding capacity).

As discussed above, the particles 203, 205, 207 could be different materials. Some examples could includes polyethylene, polypropylene, ethylene vinyl acetate (EVA), butadiene, and other suitable particles. As discussed above with respect to particle sizes, the product can include a similar blend of different materials, which may have use in various different applications.

In some embodiments, the particles 203, 205, 207 in the product 208 may be mechanically coupled (and different sizes and materials may be used to provide desired structural properties). In other embodiments, the structural support of the product 208 may be further enhanced by one or more support members or binders.

In some embodiments, various additives 218 may added to the product in one or more regions 210, 212, 214. For example, a powder binder additive may be added to facilitate the particles binding together and to improve structural properties. In some embodiments, the binder may be heat activated, and the resulting product 208 may be exposed to a heat treatment process to cause the binder to set.

In some embodiments, the additives may include compounds such as activated carbon, or zeolite.

In some embodiments, the resulting product 208 may contain more than 50% by weight of binders or other additives. For example, the resulting product 208 may includes 70-97% activated carbon or zeolite. Such embodiments may be particularly useful for particulate and chemical interception and filtration.

Other additives could include absorbants, polishing powder, or other active ingredients, including dry components and wet components.

The product 208 may also be particularly suited for acoustic dampening, particularly for use in automotive applications. For example, acoustic dampers formed according to the embodiments described herein may provide improved acoustic damping qualities as compared to other acoustic damping products, such as acoustic foam, air-laid cellulite, or shoddy fiber, particularly at low frequencies.

Furthermore, when use in certain applications (e.g. automotive), the product 208 may be shaped or formed (e.g. by compression molding) to achieve desired geometric shapes, which may be useful in door panels, interior finishings or trim, etc.

Embodiments as described herein may also be especially suitable for thermal insulation. For example, products 208 made with polymers may be suitable for low temperature insulation (e.g. residential or commercial applications), whereas products 208 made using ceramic particles may be suited for use in high temperature applications (e.g. industrial applications).

Figure 12:
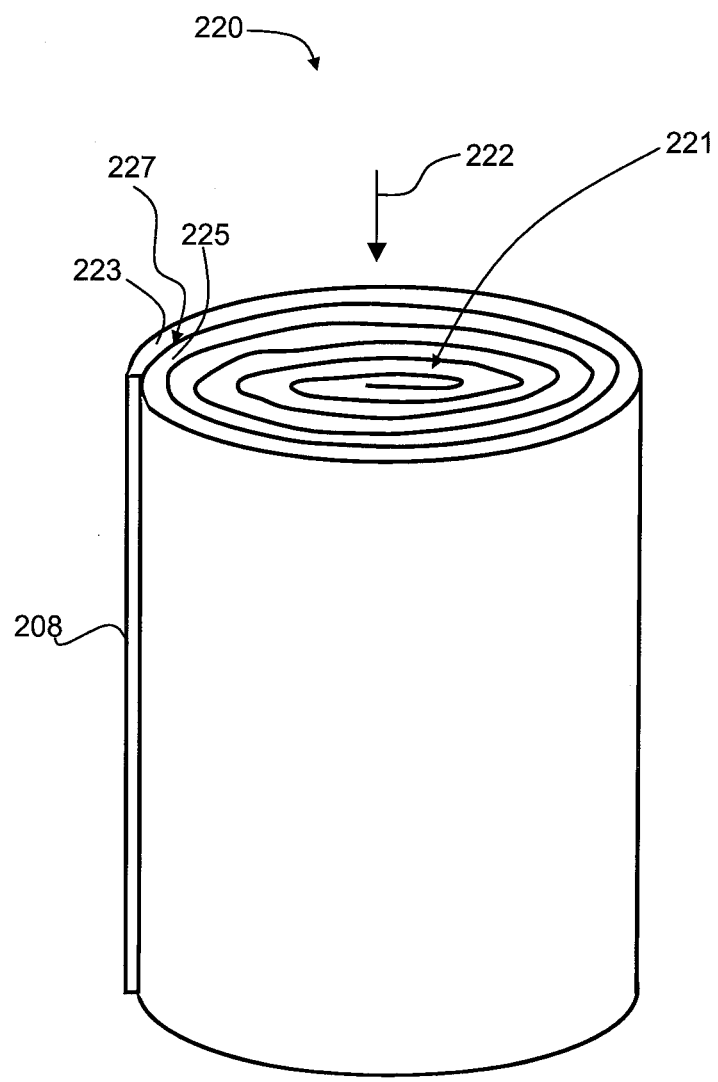
FIG. 12 is a perspective view of a cylindrical member formed from a product.

Turning now to FIG. 12, in some embodiments the product 208 can be wound to form a cylindrical member 220. The cylindrical member 220 may have a desired shape that is useful for particular applications, such as filtration In some embodiments, the cylindrical member 220 may have a central core region 221 that may be compressed to modify the shape of the member 220 (e.g. a portion of the member 220 may be compressed along the longitudinal axis of the cylindrical member 220 generally in the direction 222 using a mandrel). This may provide for desired density gradients within the member 220 (e.g. a more dense core region 221, a less dense outer region).

In some embodiments, the cylindrical member 220 may include one or more additives, such as a binder. For example, the cylindrical member 220 may include a heat-activated binder, and the mandrel may heat the member 220 during the compaction to activate the binder.

In some embodiments, a sheet of material 227 (e.g. a binder or other material) may be rolled with the product 208 to form the member 220. For example, the sheet of material 227 may be sandwiched between adjacent layers 223, 225 of the member 220.

According to some embodiments as described herein, polymers of lower quality may be used as the liquid while still providing good strength, stiffness and softness in the resulting particles. For example, in some embodiments it may be possible to use a polymer having a melt flow index of about 500 and obtain properties comparable to a polymer having a melt flow index or about 30.

Figure 13:
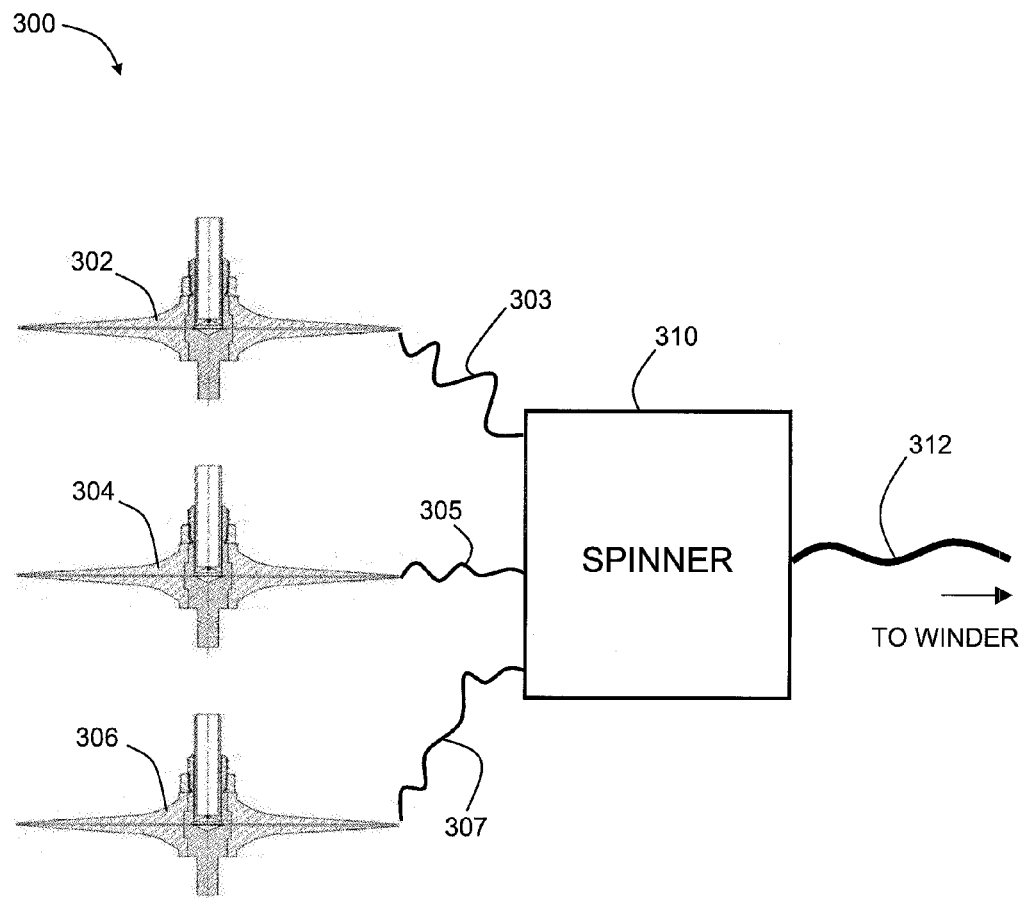
FIG. 13 is a schematic view of a system for textile manufacturing according to another embodiment.

Turning now to FIG. 13, illustrated therein is a system 300 for textile manufacturing according to another embodiment.

As shown, the system 300 includes a plurality of apparatus 302, 304, 306 (which may be generally similar to the apparatus as described above, such as apparatus 10).

Each apparatus 302, 304, 306 is configured to generate continuous fibers of material (e.g. fibers 303, 305, 307). For example, each apparatus 302, 304, 306 may be provided with a liquid polymer and operated to generate a continuous fibers of polymer materials. These fibers will tend to accumulate around each apparatus 302, 304, 306, forming a "lasso" or ring around the apparatus 303, 304, 306. These fibers can then be "hooked" or captured for feeding into a processing device, such as a textile spinner 310. The textile spinner 310 can then output a textile product, such as a yarn 312.

Accordingly, the system 300 can be used to turn raw or liquid polymer directly into yarn 312. In particular, any desired pulling, warming and stretching can generally be done as part of a single process.

Furthermore, since the fibers 303, 305, 307 may have different sizes depending on the operating characteristics of the apparatus 302, 304, 306 and be made of different materials (e.g. depending on the polymers used) the resulting yarn 312 may be blends of various materials and have different structural properties. For example, some blends could include spandex, polylactic acid (PLA), rayon, etc.

For example, in some embodiments the fibers 303, 305, 307 may be very thin (e.g. on the order of one micrometer) and many fibers 303, 305, 307 may be combined together to form a very strong and durable yarn 312 (as compared with conventional yarn spinning where the individual fibers are often on the order of five to seven micrometers in diameter).

In some embodiments, after leaving the spinner 310 the yarn 312 can be wound onto a roll. In some embodiments, this may be done as a straight wind without additional twisting.

Figure 14:
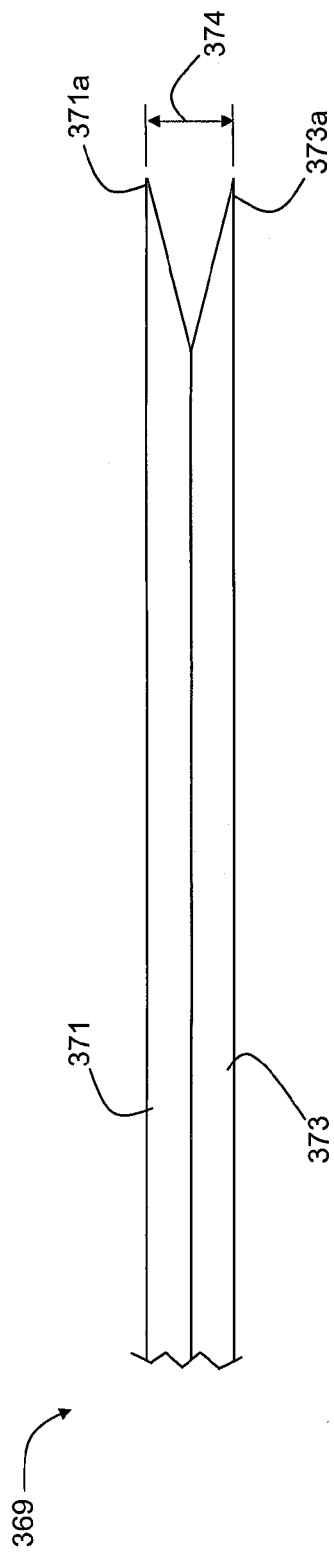
FIG. 14 is a side view of a bifurcated rotor plate according to one embodiment.

Turning now to FIG. 14, in some embodiments a bifurcated rotor plate 369 (which may be similar to the intermediate rotor plate 69 as described above) can be formed by joining two separate plate members together. For example, as shown a first or upper plate member 371 having a first edge 371a can be joined to a second or lower plate member 373 having a second edge 373 so as to form a bifurcated rotor plate 369. As shown, the edges 371a, 373a of the rotor plate 369 are spaced apart by an edge distance 374.

In some embodiments, the plate members 371, 373 may be made of a metal such as a 400 series stainless steel (for example as used for making razor blades) or other suitable material selected so that the edges 371a, 373a of the plates can be made very sharp.

Generally, the plate members 371, 373 can be joined together using various suitable techniques, such as by welding or using high-strength adhesives.

Figure 15:
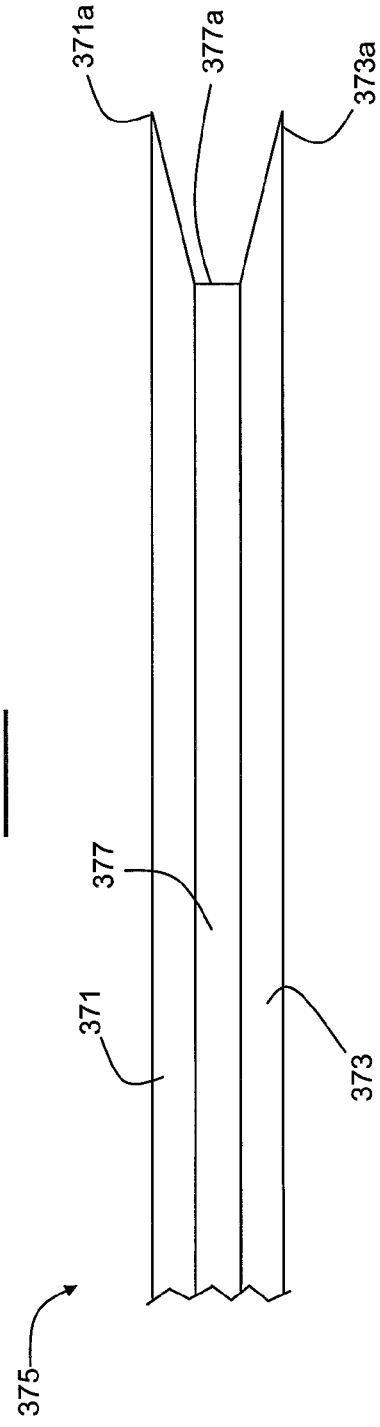
FIG. 15 is a side view of a bifurcated rotor plate according to another embodiment.

As shown in FIG. 15, in some embodiments, an intermediate plate member 377 may be provided between the plate members 371, 373. The intermediate plate member 377 may help in securing the plate members 371, 373 together, and furthermore may help provide additional rigidity to the plate members 371, 373 so as to inhibit unwanted deflection during use.

In some embodiments, particularly where the apparatus is operating at low flow rates and high speeds, a condition called "spitting" may occur, where the liquid does not smoothly transition from bulk to film flow along the capillary surfaces, but rather tends to be discharged intermittently in larger globules or clusters, which is generally undesirable.

Figure 16:
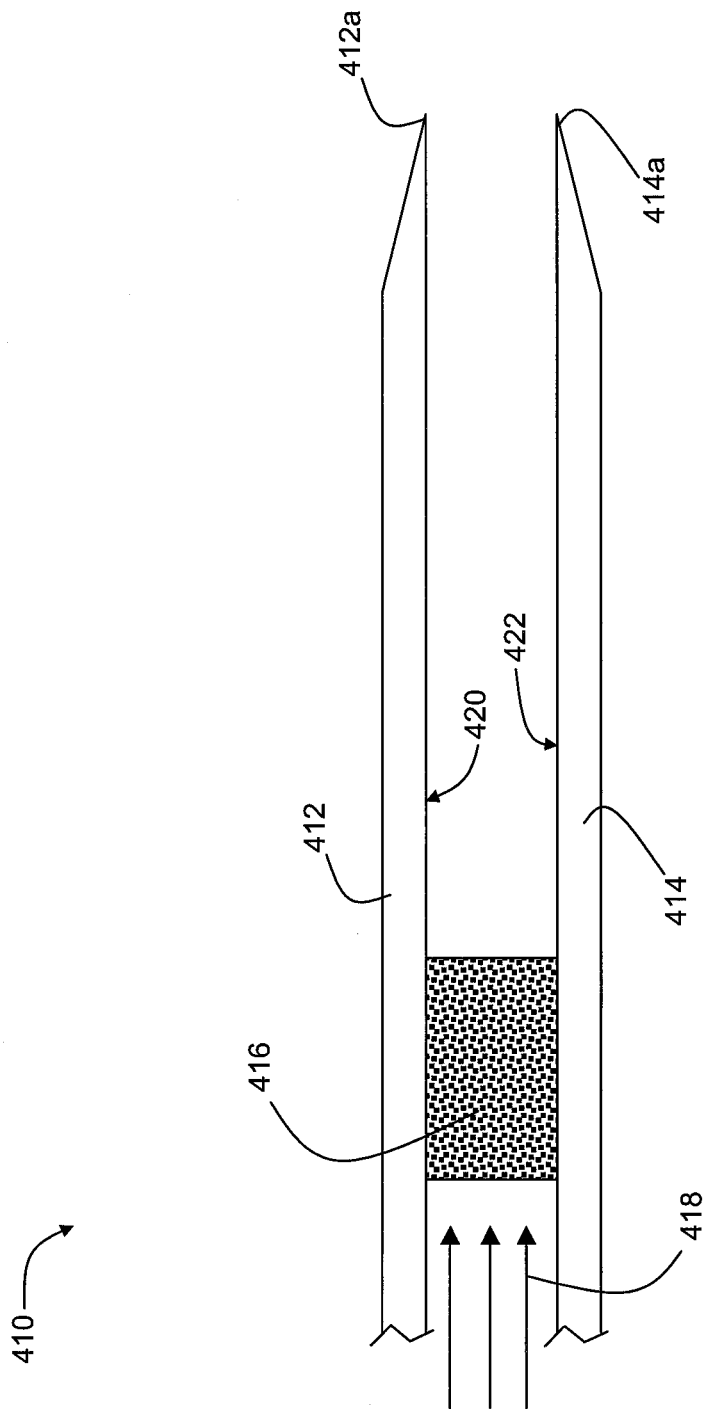
FIG. 16 is a side view of two rotor plates having a porous medium therebetween according to another embodiment.

Two techniques have been developed to address the spitting problem and to encourage the liquid to transition form bulk liquid into film flow. For example, as shown in FIG. 16, in one apparatus 410 a porous medium 416 is provided between two rotor plates 412, 414.

The porous medium 416 tends to interfere with the flow of incoming liquid 418 as it passes through the porous medium 416, smoothing the flow rate so as to encourage the liquid to form films on the opposing surfaces 420, 422.

As shown, in some embodiments, the porous medium 416 may span the entire gap between the rotor plates 412, 414. In other embodiments, only a portion of the gap between the rotor plates 412, 414 may have a porous medium 416 therebetween In some embodiments, the porous medium 416 may have an annular shape, and may surround all or at least a portion of the inner region 17a into which the liquid is received. In other embodiments, the porous medium 416 may be intermittently spaced around the inner region 17a, or have various other configurations.

In some embodiments, the porous medium 416 may include at least a portion made of a sintered metal. In other embodiments, the porous medium 416 may include ceramics, polymers, foams or other suitably selected materials that tend to encourage the formation of film flow on the surfaces 420, 422.

Figure 17:
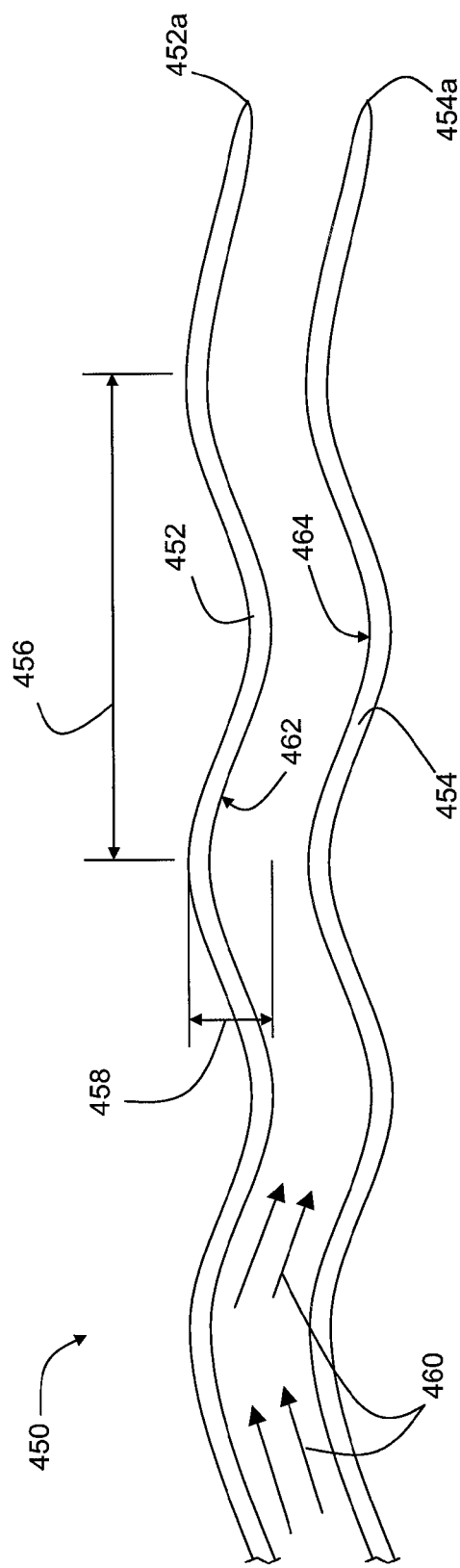
FIG. 17 is a side view of two rotor plates having a wavy profile according to another embodiment.

In another embodiment, as shown in FIG. 17, in apparatus 450 at least a portion of the rotor plates 452, 454 is sized and shaped to disturb the path of the incoming liquid 460 to encourage the liquid 450 to contact the surfaces 462, 464.

For example, as shown each of the upper and lower rotor plates 452 has a wavy profile. The wavy profile tends to disturb the path of the liquid 460 as it moves outwardly towards the edges 452a, 454a, and imparts a vertical velocity component that encourages the liquid 460 to contact the surfaces 462, 464 of the plates 452, 454 and adopt a film flow condition thereon.

In some embodiments, the wavy profile may be periodic, with a wavelength 456 and a height 458. For example, in some embodiments, the wavelength 456 may be between 0.1 mm and 10 mm, while the height 258 may be between 0.01 mm and 1.0 mm. In some embodiments, the height 458 may be about 0.5 mm.

In other embodiments, the wavy profile of the rotor plates 452, 454 need not be periodic (e.g. the wavy profile may be irregular).

Figure 18:
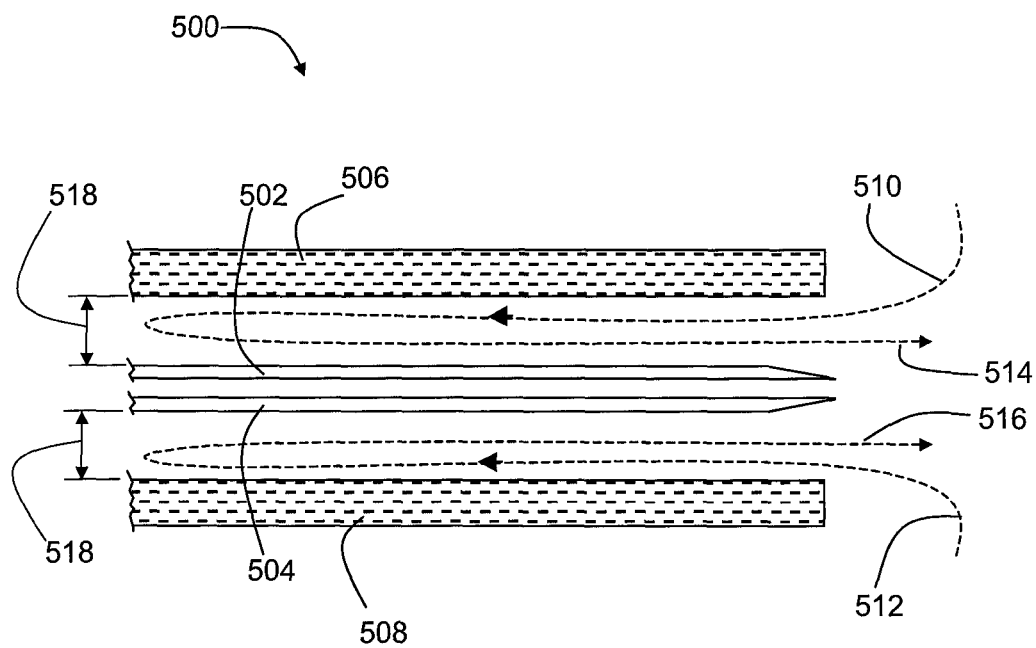
FIG. 18 is a schematic view of an apparatus for forming particles having heating elements according to yet another embodiment.

Turning now to FIG. 18, in some embodiments an apparatus for forming particles may be configured so as to eliminate or reduce the requirements for blowers, cowlings, and other components that can add to the complexity and cost of the apparatus. For example, as shown, the apparatus 500 includes two rotor plates 502, 504 configured to rotate generally as described above (although more than two rotor plates could be provided).

The apparatus 500 also includes one or more heating elements, for example an upper heating element 506 and a lower heating element 508. As shown, the heating elements 506, 508 are generally flat members that are fixed in place adjacent the upper and lower rotor plates 502, 504, respectively.

As the rotor plates 502, 504 rotate, they cooperate with the heating elements 506, 508 so as to draw air into the apparatus 500. For example, air may be drawn into the apparatus as an upper cold airstream 510 and lower cold airstream 512. The airstreams 510, 512 are drawn between the heating elements 506, 508 and the rotor plates 502, 504, and are heated by the heating elements 506, 508 before being ejected as hot airstreams 514, 516.

The heating elements 506, 508 and hot airstreams 514, 516 may help to heat the rotor plates 502, 504 to a desired temperature (which is particularly desirable when the liquid being used in the apparatus 500 is a meltable polymer). Where a sufficient quantity of air can be drawn into the apparatus 500, no additional heating of the rotor plates 502, 504 may be required to reach the desired operating temperature.

Furthermore, in some embodiments the hot airstreams 514, 516 may assist in attenuating the particles being ejected from the apparatus 500.

In some embodiments, the heating elements 506, 508 are spaced apart from the rotor plates 502, 504 by a heating gap 518. In some embodiments, the heating gap 518 is between 0.1 mm and 1.0 cm.

While the above description provides examples of one or more methods and/or apparatuses, it will be appreciated that other methods and/or apparatuses may be within the scope of the present description as interpreted by one of skill in the art.

The invention claimed is:

1. An apparatus for forming particles from a liquid, comprising:
   a. a rotor assembly having at least one surface sized and shaped so as to define at least one capillary, each capillary having an inner region adjacent an axis of rotation of the rotor assembly, an outer region distal from the axis of rotation, and an edge adjacent the outer region;
   b. wherein the rotor assembly is configured to be rotated at an angular velocity selected such that when the liquid is received in the inner region of the at least one capillary, the liquid will move from the inner region to the outer region, adopt an unsaturated condition on the at least one surface such that the liquid flows as a film along the at least one surface and does not continuously span the capillary, and, upon reaching the edge, separates from the at least one surface to form at least one particle.

2. The apparatus of claim 1, wherein the rotor assembly includes two plates having opposing upper and lower planar surfaces spaced apart by a gap distance and defining at least one capillary therebetween.

3. The apparatus of claim 1, wherein the edge is a blunt edge.

4. The apparatus of claim 1, wherein the edge is a sharp edge having a radius selected to inhibit the accumulation of liquid thereon.

5. The apparatus of claim 1, wherein the rotor assembly includes at least three plates having at least two pairs of opposing planar surfaces, each pair of opposing planar surfaces spaced apart by a gap distance and defining a capillary therebetween.

6. The apparatus of claim 5, wherein at least one of the plates has a bifurcated edge that allows two separate particle streams to emerge from an upper edge and lower edge thereof.

7. The apparatus of claim 1, further comprising a shroud adjacent the rotor assembly and configured to direct gas flowing around the rotor assembly as the rotor assembly rotates.

8. The apparatus of claim 1, wherein the rotor assembly is configured such that, during rotation, the rotor assembly interacts with surrounding gas so as to produce significant friction as a result of drag and thereby causes the rotor assembly to be heated.

9. The apparatus of claim 1, wherein the rotor assembly is configured to be rotated at a predetermined angular velocity and receive liquid at a flow rate so as to emit a generally continuous film, and wherein this continuous film can further disintegrate into particles.

10. The apparatus of claim 1, further comprising a feed chamber for receiving the liquid, the feed chamber being adjacent the axis of rotation and in fluid communication with the inner region of each capillary.

11. The apparatus of claim 1, wherein the rotor assembly is provided in a sealed chamber, and wherein at least a partial vacuum is drawn within the chamber.

12. A method for forming particles, comprising the steps of:

a. providing at least one surface sized and shaped so as to define at least one capillary, said capillary having an inner region, an outer region, and an edge;

b. providing a liquid to the inner region of the at least one capillary; and c. rotating the capillary at an angular velocity selected such that the liquid will move from the inner region to the outer region, adopt an unsaturated condition on the at least one surface such that the liquid flows as a film along the at least one surface and does not continuously span the capillary, and, upon reaching the edge, separates from the at least one surface to form at least one particle.

13. The method of claim 12, wherein the liquid is provided to the inner region at an input mass flow rate, and the input mass flow rate and angular velocity are selected so that the liquid separates from the at least one surface as a generally continuous film.

14. The method of claim 12, wherein the liquid is provided to the inner region at an actual mass flow rate less than a potential mass flow rate of liquid that can be pumped by centripetal forces into the capillary.

15. The method of claim 12, further comprising the step of attenuating the particles after they have separated from the at least one surface.

16. The method of claim 12, further comprising the step of directing gas around or along the edge of the at least one capillary to facilitate the separation of or to transport the particles from the at least one edge.

17. The method of claim 12, wherein the liquid is selected from the group consisting of:
   a. liquid polymers;
   b. molten glasses;
   c. molten metals;
   d. molten salts;
   e. minerals;
   f. ceramics;
   g. pure liquid substances;
   h. suspensions;
   i. emulsions
   j. solutions; and
   k. mixtures.

18. The method of claim 12, wherein the liquid is composed of two immiscible liquids that can be homogenized during their passage through the capillary and release from the edge.

19. The method of claim 12, wherein the liquid is a melted polymer, and further comprising the step of melting the polymer to form the liquid, passing the molten polymer through the rotating capillary, and wherein the melted polymer solidifies by cooling after it separates from the at least one surface to form solid particles.

20. The method of claim 12, wherein the particles are fibers.

21. The method of claim 12, wherein the particles are droplets.

22. The method of claim 12, wherein the liquid is a melted polymer, and further comprising the step of mixing the emitted particles of polymer with a gas having particles entrained therein so as to form a composite.

23. An apparatus for forming particles from a liquid, comprising:
   a. a rotor assembly having at least two plates secured to a spindle and having at least one pair of opposing surfaces thereon, each pair of opposing surfaces spaced apart by a gap distance and defining at least one capillary therebetween, said capillary having an inner region adjacent an axis of rotation of the rotor assembly, an outer region distal from the axis of rotation, and an edge adjacent the outer region;
   b. wherein the spindle is configured to be coupled to a drive apparatus configured to rotate the rotor assembly at an angular velocity selected such that when the liquid is received in the inner region of the at least one capillary, the liquid will move from the inner region to the outer region, adopt an unsaturated condition on the at least one surface such that the liquid flows as a film along the at least one surface and does not continuously span the capillary, and, upon reaching the edge, separates from the at least one surface to form at least one particle.

24. The apparatus of claim 2, wherein the gap distance is between about 5 and 2000 micrometers.

25. The apparatus of claim 4, wherein the sharp edge has a radius of less than 30 micrometers.

26. The apparatus of claim 5, wherein the at least three plates includes an upper plate, a lower plate and at least one intermediate plate.

27. The apparatus of claim 26, wherein the upper plate and lower plate have tapered profiles.

28. The apparatus of claim 7, wherein the shroud is further configured so as to cause heated gas to impinge upon the particles in a coaxial direction during rotation of the rotor assembly.

29. The apparatus of claim 2, wherein the rotor assembly is configured such that the diameter of the plates times the rate of rotation is greater than about 50,000 cm•RPM.

30. The apparatus of claim 2, wherein the rotor assembly is configured such that the diameter of the plates times the rate of rotation is less than about 700,000 cm•RPM.

31. The apparatus of claim 2, wherein the rotor assembly is configured such that the diameter of the plates times the rate of rotation is between about 10,000 cm•RPM and 1.4 million cm•RPM.

32. The apparatus of claim 2, wherein the rotor assembly is configured such that the diameter of the plates times the rate of rotation is less than about 1.4 million cm•RPM.

33. The apparatus of claim 2, wherein the rotor assembly is configured such that the diameter of the plates times the rate of rotation is greater than about 10,000 cm•RPM.

34. The apparatus of claim 9, wherein the film disintegrates into particles with a poly-disperse range of sizes.

35. The apparatus of claim 34, further configured to provide high velocity jets of gas that interact with the continuous film to fibrillate or atomize the film into particles.

36. The apparatus of claim 1, further comprising at least one heater sized and shaped to heat the at least one particle.

37. The apparatus of claim 36, wherein the at least one heater is provided adjacent the edge of the rotor assembly.

38. The apparatus of claim 11, further comprising at least one heater sized and shaped to heat the at least one particle.

39. The method of claim 13, further comprising transforming the continuous film outside of the capillary and within the surrounding space to form particles.

40. The method of claim 39, wherein the transforming of the continuous film includes impinging the continuous film with high velocity jets of gas to fibrillate or atomize the particles.

41. The method of claim 15, wherein the attenuating includes evaporation from a particle to leave a smaller droplet or a dry particle.

42. The method of claim 15, wherein the particles are ligaments or fibers, and the attenuating includes evaporation of a solvent.

43. The method of claim 15, wherein the particles are ligaments or fibers, and the attenuating includes elongation thereof in a surrounding gas.

44. The method of claim 15, wherein the attenuating of the particles includes electrostatic spinning.

45. The method of claim 15, wherein the attenuating of the particles includes directing heated gas on the particles.

46. The method of claim 12, wherein the step of providing at least one surface sized and shaped so as to define at least one capillary includes providing a rotor assembly including two plates having opposing upper and lower surfaces spaced apart by a gap distance to define at least one capillary therebetween.

47. The method of claim 46, wherein at least one of the plates has a blunt edge.

48. The method of claim 46, wherein at least one of the plates has a sharp edge having a radius selected to inhibit the accumulation of liquid thereon.

49. The method of claim 46, wherein at least one of the plates has a bifurcated edge that allows two separate particles streams to emerge from an upper edge and lower edge thereof.

50. The method of claim 16, wherein the directing gas causes the attenuation or subsequent chemical reaction or physical alteration of the emerging particles.

51. The method of claim 46, wherein the angular velocity and plate diameter are selected such that the diameter of the plate times the rate of rotation is greater than about 50,000 cm•RPM.

52. The method of claim 46, wherein the angular velocity and plate diameter are selected such that the diameter of the plate times the rate of rotation is between about 10,000 cm•RPM and 1.4 million cm•RPM.

53. The method of claim 46, wherein the angular velocity and plate diameter are selected such that the diameter of the plate times the rate of rotation is less than about 1.4 million cm•RPM.

54. The method of claim 46, wherein the angular velocity and plate diameter are selected such that the diameter of the plate times the rate of rotation is greater than about 10,000 cm•RPM.

55. The method of claim 46, wherein the angular velocity and plate diameter are selected such that the diameter of the plate times the rate of rotation may be as high as 700,000 cm•RPM.

56. The method of claim 46, wherein the angular velocity is selected such that, as the plates rotate, the plates interact with surrounding gas so as to produce significant friction as a result of drag and thereby causes the plates to be heated.

57. The method of claim 19, further comprising the step of attenuating the particles as they solidify.

58. The method of claim 21, further comprising the step of mixing the droplets with at least one gas.

59. The method of claim 58, wherein the liquid includes water and the gas includes carbon dioxide, and the mixing of the droplets as they pass through the surrounding carbon dioxide produces carbonated water.

60. The method of claim 58, wherein the at least one gas includes pollutants entrained therein, and wherein the mixing is configured to transfer the pollutants from the at least one gas into the droplets.

61. The method of claim 60, wherein the absorption is enhanced by providing chemicals within the droplets having an affinity for the pollutants.

62. The method of claim 21, further comprising the step of subjecting the emitted droplets to a vacuum selected so as to freeze dry the droplets.

63. The method of claim 21, further comprising the step of subjecting the emitted droplets to a vacuum so as to remove volatile contaminants.

64. The method of claim 58, wherein the at least one gas is heated so that the spray of fine droplets dries.

65. The method of claim 64 wherein the drying leaves a residual nonvolatile droplet or solid particle.

66. The method of claim 21, further comprising the step of subjecting the emitted particles to at least one of a vacuum, heat, cooling, light and ionizing radiation.

67. The method of claim 22, wherein the particles are selected from the group consisting of:
  a. carbon;
  b. zeolites;
  c. absorbents;
  d. silicates;
  e. aluminas;
  f. minerals;
  g. ceramics;
  h. glass; and
  i. beads.

68. The method of claim 12, wherein the particles are produced at a mass rate of at least 20 grams per minute.

69. The method of claim 12, wherein the particles are produced at a mass rate of between about 20 and 50 grams per minute.

70. The method of claim 12, wherein the particles are produced at a mass rate of at least 200 grams per minute.

71. The method of claim 12, wherein the particles are produced at a mass flow rate of at least 1000 grams per minute.

72. The apparatus of claim 23, wherein the rotor assembly is configured such that the diameter of the plates times the rate of rotation is between about 10,000 cm•RPM and 1.4 million cm•RPM.

73. The apparatus of claim 23, wherein the rotor assembly is configured such that the diameter of the plates times the rate of rotation is less than about 1.4 million cm•RPM.

74. The apparatus of claim 23, wherein the rotor assembly is configured such that the diameter of the plates times the rate of rotation is greater than about 10,000 cm•RPM.

75. A system for producing products, comprising:
  a. at least one apparatus for forming particles from a liquid, each apparatus having:
    i. a rotor assembly having at least one surface sized and shaped so as to define at least one capillary, each capillary having an inner region adjacent an axis of rotation of the rotor assembly, an outer region distal from the axis of rotation, and an edge adjacent the outer region;
    ii. wherein the rotor assembly is configured to be rotated at an angular velocity selected such that when the liquid is received in the inner region of the at least one capillary, the liquid will move from the inner region to the outer region, adopt an unsaturated condition on the at least one surface such that the liquid flows as a film along the at least one surface and does not continuously span the capillary, and, upon reaching the edge, separates from the at least one surface to form at least one particle; and
  b. a collection device for receiving the at least one particle.

76. The system of claim 75, wherein the at least one apparatus includes a first apparatus configured to deposit first particles in a first region of the collection device, and a second apparatus configured to deposit second particles in a second region of the collection device.

77. The system of claim 76, wherein the collection device is configured to move the received particles in at least one direction so that the resulting product tends have a smooth blend of particles from the first apparatus and second apparatus.

78. The system of claim 77, wherein the first and second particles are of different sizes.

79. The system of claim 77, wherein the first and second particles are made of different materials.

80. The apparatus of claim 2, wherein at least one of the plates is a bifurcated rotor plate formed by joining two separate plate members together.

81. The apparatus of claim 80, wherein the two separate plate members are metal and are coupled together by welding.

82. The apparatus of claim 80, wherein at least one of the two separate plate members is made of a 400 series stainless steel.

83. The apparatus of claim 80, further comprising an intermediate plate member provided between the two separate plate members.

84. The apparatus of claim 2, further comprising a porous medium provided between the two plates.

85. The apparatus of claim 84, wherein the porous medium spans the entire gap between the plates.

86. The apparatus of claim 84, wherein the porous medium includes at least a portion made of a sintered metal.

87. The apparatus of claim 84, wherein the porous medium has an annular shape and surrounds at least a portion of the inner region.

88. The apparatus of claim 2, wherein at least a portion of the plates is sized and shaped to disturb the path of the liquid to encourage the liquid to contact the at least one surface.

89. The apparatus of claim 88, wherein at least one of the plates has a wavy profile.

90. The apparatus of claim 89, wherein the wavy profile is periodic.

91. The apparatus of claim 2, further comprising at least one heating element adjacent at least one of the plates.

92. The apparatus of claim 91, wherein the at least one heating apparatus is configured to cooperate with the plates so as to draw air into the apparatus as the rotor assembly rotates.

93. The apparatus of claim 92, wherein the air drawn into the apparatus is heated by the heating elements for heating the plates to a desired operating temperature.

* * * * *